(12) United States Patent
Kim et al.

(10) Patent No.: US 10,999,781 B2
(45) Date of Patent: May 4, 2021

(54) METHOD FOR TRANSMITTING RRC MESSAGE AND WIRELESS DEVICE

(71) Applicant: LG ELECTRONICS INC., Seoul (KR)

(72) Inventors: Jaehyun Kim, Seoul (KR); Taehun Kim, Seoul (KR); Sangmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 97 days.

(21) Appl. No.: 16/348,815

(22) PCT Filed: Jan. 9, 2017

(86) PCT No.: PCT/KR2017/000279
§ 371 (c)(1),
(2) Date: May 9, 2019

(87) PCT Pub. No.: WO2018/088630
PCT Pub. Date: May 17, 2018

(65) Prior Publication Data
US 2019/0268827 A1   Aug. 29, 2019

Related U.S. Application Data

(60) Provisional application No. 62/419,479, filed on Nov. 9, 2016.

(51) Int. Cl.
*H04W 48/08* (2009.01)
*H04W 48/02* (2009.01)
*H04W 76/27* (2018.01)

(52) U.S. Cl.
CPC .......... *H04W 48/08* (2013.01); *H04W 48/02* (2013.01); *H04W 76/27* (2018.02)

(58) Field of Classification Search
CPC ...... H04W 48/08; H04W 48/02; H04W 76/27
See application file for complete search history.

(56) References Cited

U.S. PATENT DOCUMENTS 10,390,189 B2 * 8/2019 Pinheiro ............... H04W 48/02
2012/0269099 A1   10/2012 Chin et al.
(Continued)

FOREIGN PATENT DOCUMENTS

KR   1020150120534   10/2015
WO      2015142048    9/2015

OTHER PUBLICATIONS

PCT International Application No. PCT/KR2017/000279, International Search Report dated Jul. 25, 2017, 4 pages.

*Primary Examiner* — Michael J Moore, Jr.
(74) *Attorney, Agent, or Firm* — Lee Hong Degerman Kang Waimey

(57) ABSTRACT

One disclosure of the present specification provides a method by which a wireless device transmits an RRC message. The method can comprise the steps of: allowing, an AS layer of the wireless device, to acquire an NAS signaling request message, an RRC establishment cause field, and a call type field from an NAS layer; checking the acquired RRC establishment cause field and the call type field; determining, when the NAS signaling request message includes user data according to an optimization plan through a control plane, whether to perform or skip an examination for access blocking (AB) based on the RRC establishment cause field and/or the call type field; and transmitting, when blocking is not achieved or when the examination is skipped according to the examination result, an RRC connection request message to a base station so as to transmit the NAS signaling request message including the user data.

12 Claims, 19 Drawing Sheets

(56) References Cited

U.S. PATENT DOCUMENTS

| | | | |
|---|---|---|---|
| 2015/0126147 A1 | 5/2015 | Koskela et al. | |
| 2015/0223146 A1* | 8/2015 | Pinheiro | H04W 48/02 370/230 |
| 2015/0257088 A1* | 9/2015 | Hsu | H04L 29/06176 370/328 |
| 2016/0227469 A1* | 8/2016 | Kim | H04W 4/14 |
| 2016/0262068 A1* | 9/2016 | Won | H04W 48/02 |
| 2016/0381623 A1* | 12/2016 | Lee | H04W 48/12 455/418 |
| 2017/0006644 A1* | 1/2017 | Tsuboi | H04L 69/28 |
| 2018/0020382 A1* | 1/2018 | Kim | H04W 48/02 |
| 2018/0049258 A1* | 2/2018 | Kim | H04L 65/1069 |
| 2018/0199261 A1* | 7/2018 | Lee | H04W 48/16 |
| 2018/0220363 A1* | 8/2018 | Hoglund | H04W 48/16 |
| 2018/0270789 A1* | 9/2018 | Jia | H04W 52/0209 |
| 2018/0376407 A1* | 12/2018 | Myhre | H04W 48/16 |
| 2019/0320485 A1* | 10/2019 | Kim | H04W 76/25 |
| 2020/0314943 A1* | 10/2020 | Kim | H04W 4/70 |

\* cited by examiner

METHOD FOR TRANSMITTING RRC MESSAGE AND WIRELESS DEVICE

CROSS-REFERENCE TO RELATED APPLICATIONS

This application is the National Stage filing under 35 U.S.C. 371 of International Application No. PCT/KR2017/000279, filed on Jan. 9, 2017, which claims the benefit of U.S. Provisional Application No. 62/419,479, filed on Nov. 9, 2016, the contents of which are hereby incorporated by reference herein in its entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
|---|---|
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Recently, there has been a lot of research on MTC (Machine Type Communication) communication between machines without human intervention, that is, between devices and between a device and a sever without human intervention.

MTC communication is also called IoT (Internet of Things) communication because there is no human intervention. Performing IoT communication in a cellular manner rather than using a wireless LAN like Wi-Fi is called CIoT. Unlike the wireless LAN, CIoT supports not only IP based communication but also non-IP based communication.

Meanwhile, in order to support CIoT service, 3GPP improved the physical layer, namely RAT (Radio Access Technology). The improved RAT is called NB-IoT (Narrowband-IoT).

However, many devices perform data transmission in an environment using the NB-IOT RAT. In this case, there is a problem that the network may be overloaded and congested.

Meanwhile, CIoT devices using NB-IoT RAT are generally expected to send and receive small amounts of data. However, in order for the CIoT device to transmit and receive data, the CIoT device must be exchanged considerable amounts of signals with the base station in advance. It may be inefficient to transmit/receive a large amount of control signals in advance in order to transmit/receive such a small amount of data. In order to solve this problem, there is an attempt to optimize an evolved packet service (EPS) for CIoT using a control plane (CP) or using a user plane (UP).

However, even when the CIoT device transmits a small amount of data according to the optimization scheme, the transmission may fail in a network congestion state.

SUMMARY OF THE INVENTION

Accordingly, an object of the present invention is to present a method that can solve the aforementioned problem.

In one aspect of the present disclosure, there is provided a method for transmitting a radio resource control (RRC) message by a wireless device. The method includes acquiring, by an access stratum (AS) layer of the wireless device, a non-access stratum (NAS) signaling request message, an RRC establishment cause field and a call type field from an NAS layer; checking, by the AS layer, the acquired RRC establishment cause field and call type field; when the NAS signaling request message includes user data according to optimization scheme through a control plane (CP), determining, by the AS layer, whether to perform or skip a check for access barring (AB) based on at least one of the RRC establishment cause field and the call type field; and upon determination that the check is skipped or upon determination from a result of preforming the check that an access is not barred, transmitting, by the AS layer, a RRC connection request message to a base station to transmit the NAS signaling request message including the user data.

At least one of the acquired RRC establishment cause field and call type field may be set to a value indicating the optimization scheme through the CP.

The acquiring may include further acquiring an indication from the NAS layer indicating that the NAS signaling request message includes the user data according to the optimization scheme through the CP.

When the checking of the acquired RRC establishment cause field and call type field determines that at least one of the acquired RRC establishment cause field and call type field is set to a general value, the method may further include changing at least one of the RRC establishment cause field and the call type field to the value indicating the optimization scheme through the CP based on the indication.

The method may further include receiving information related to the access barring (AB) from the base station.

The information related to the AB may include information indicating whether an access barring check is executed or skipped for an RRC connection request message including the call type field or the RRC establishment cause field set to a value indicating the optimization scheme through the CP.

In another aspect, there is provided a wireless device for transmitting a radio resource control (RRC) message. The device includes a transmitting/receiving unit; and a processor configured for controlling the transmitting/receiving unit. The processor includes an access stratum (AS) layer and an non-access stratum (NAS) layer. The access stratum (AS) layer of the processor is configured for: acquiring a non-access stratum (NAS) signaling request message, an RRC establishment cause field and a call type field from an NAS layer; checking the acquired RRC establishment cause field and call type field; when the NAS signaling request message includes user data according to optimization scheme through a control plane (CP), determining whether to perform or skip a check for access barring (AB) based on at least one of the RRC establishment cause field and the call type field; and upon determination that the check is skipped or upon determination from a result of preforming the check that an access is not barred, transmitting, by the AS layer, a RRC connection request message to a base station to transmit the NAS signaling request message including the user data.

According to the present disclosure, the aforementioned problems of the related art may be solved.

DESCRIPTION OF EXEMPLARY EMBODIMENTS

Figure 1:
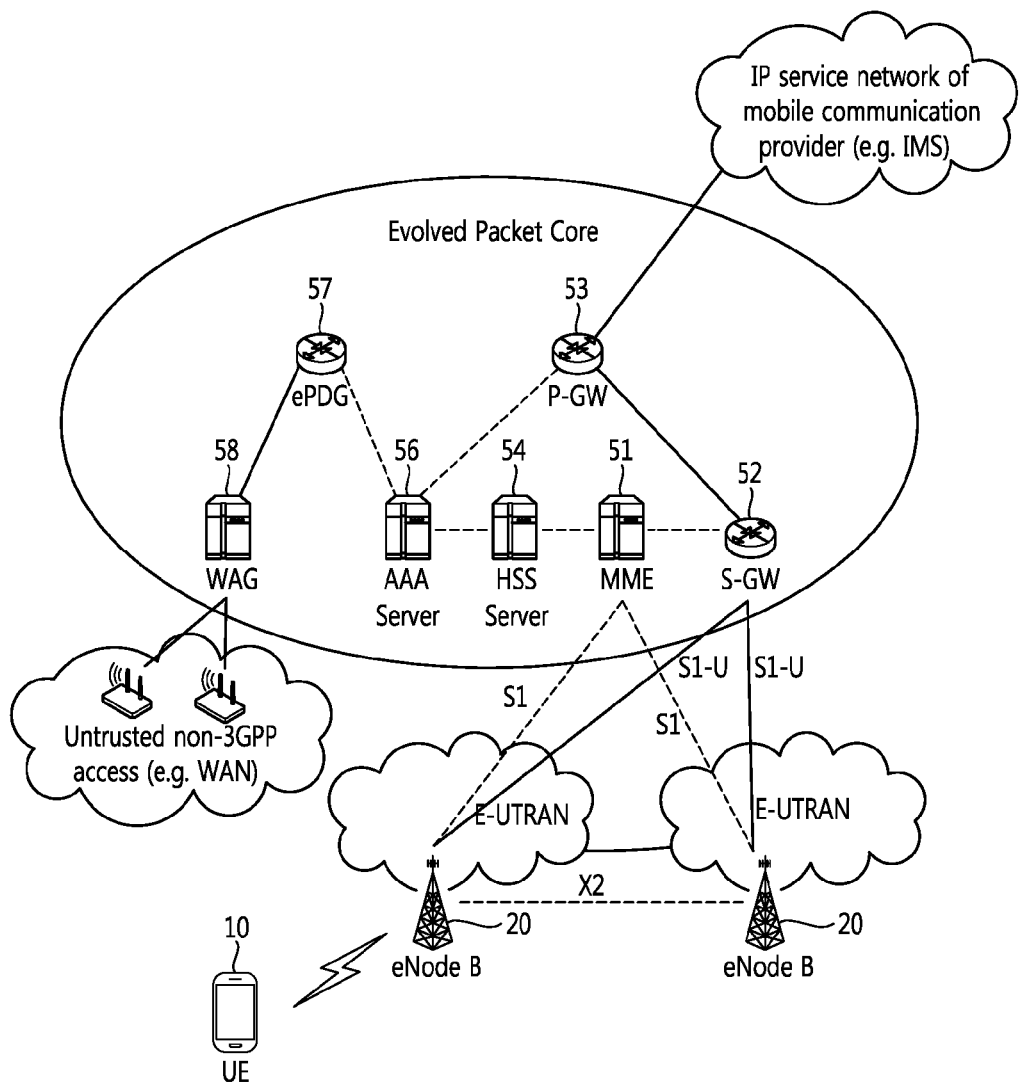
FIG. 1 is a structural diagram of an evolved mobile communication network.
Figure 2:
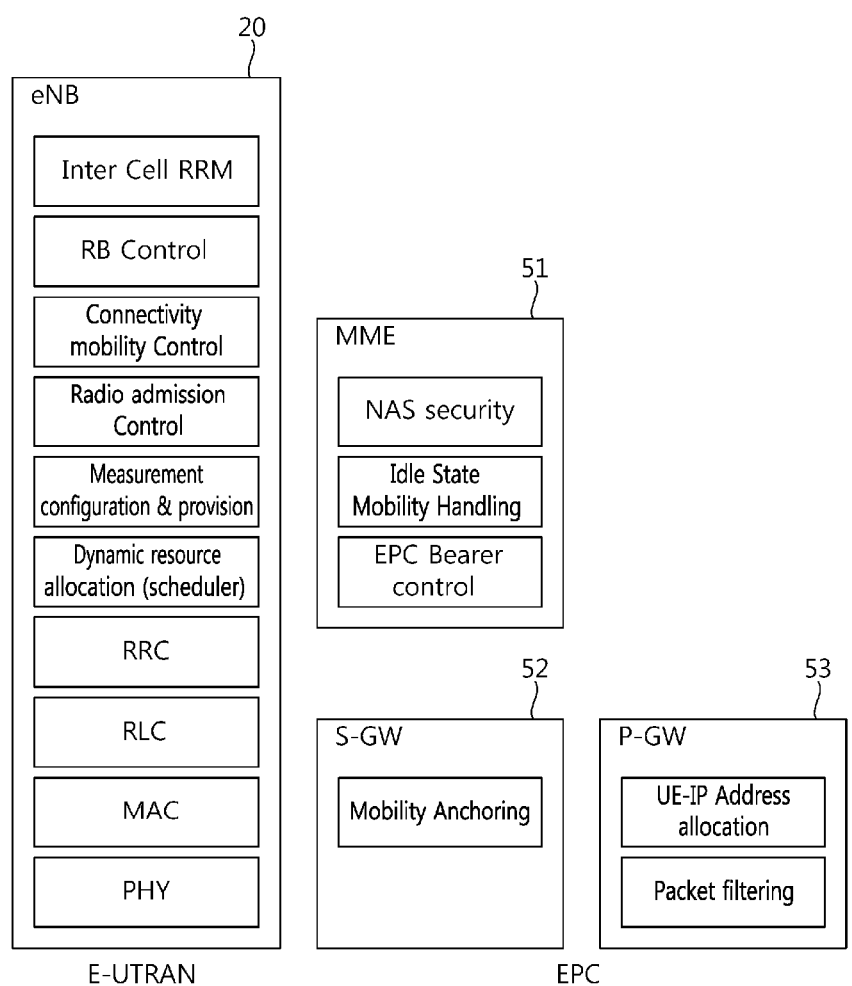
FIG. 2 is an exemplary diagram illustrating architectures of a general E-UTRAN and a general EPC.
Figure 3:
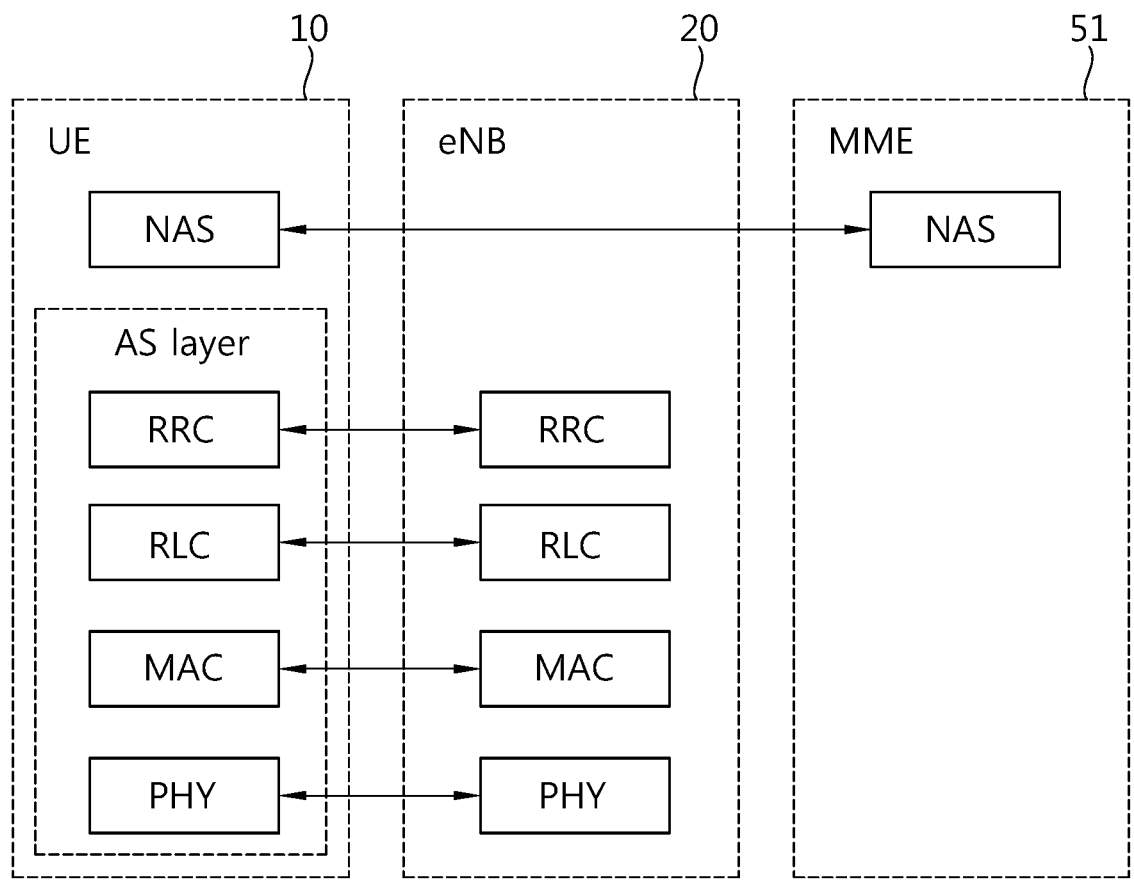
FIG. 3 is an exemplary diagram illustrating a structure of a radio interface protocol on a control plane between UE and eNodeB.
Figure 4:
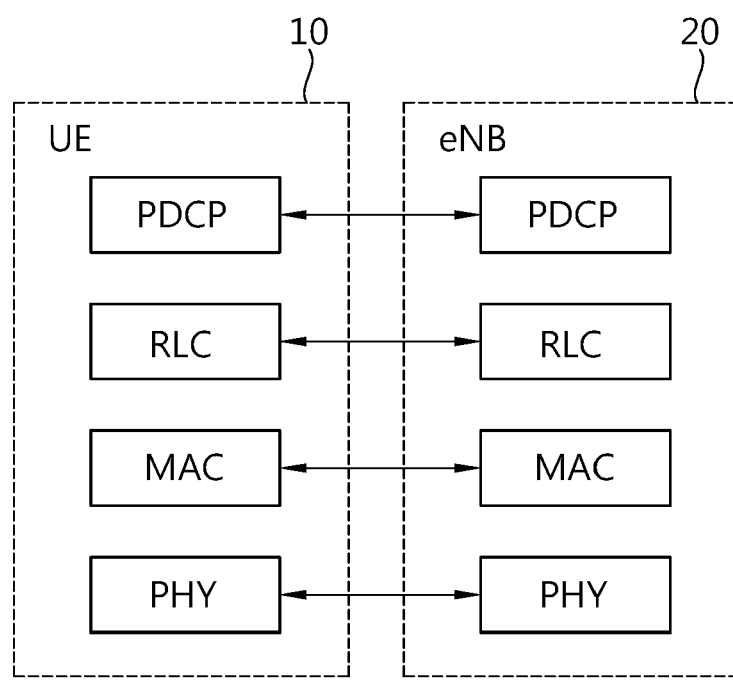
FIG. 4 is another exemplary diagram illustrating a structure of a radio interface protocol on a user plane between the UE and a base station.
Figure 5A:
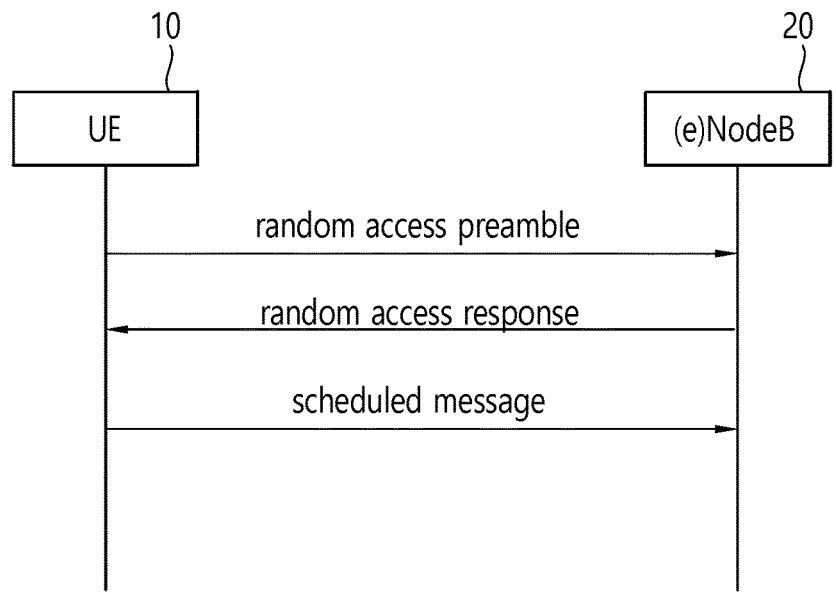
FIG. 5a is a flowchart illustrating a random access process in 3GPP LTE.
Figure 5B:
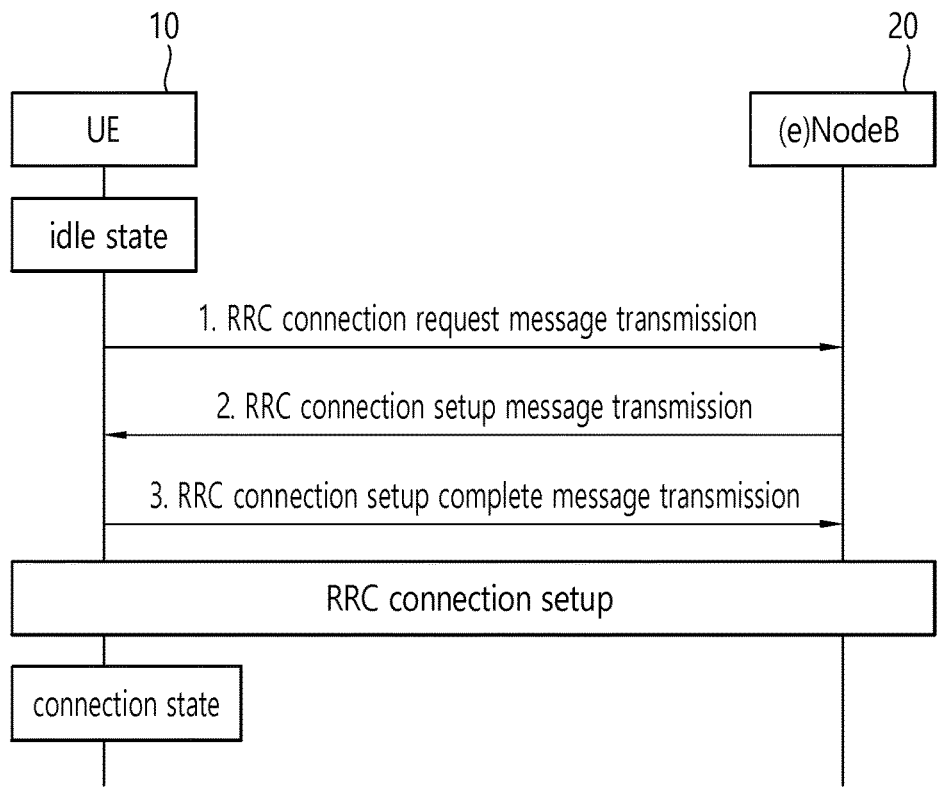
FIG. 5b illustrates a connection process in a radio resource control (RRC) layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

MM (Mobility Management) operation/procedure: An operation or procedure for mobility regulation/management/control of the UE. The MM operation/procedure may be interpreted as including one or more of an MM operation/procedure in a CS network, a GMM operation/procedure in a GPRS network, and an EMM operation/procedure in an EPS network. The UE and the network node (e.g., MME, SGSN, and MSC) exchange an MM message to perform the MM operation/procedure.

SM (Session Management) operation/procedure: An operation or procedure for regulating/managing/processing/handling a user plane and/or a bearer context/PDP context of the UE. The SM operation/procedure may be interpreted as including one or more of an SM operation/procedure in a GPRS network and an ESM operation/procedure in an EPS network. The UE and the network node (e.g., MME and SGSN) exchange an SM message to perform the SM operation/procedure.

Low priority (UE): UE configured to have a NAS signaling low priority. For further details, refer to the standard documents 3GPP TS 24.301 and TS 24.008.

Normal priority UE: UE that is not configured to have a NAS signaling low priority.

Dual priority UE: UE configured with dual priority. UE configured with the NAS signal low priority and, at the same time, configured to override the NAS signaling low priority indicator. For further details, refer to the standard documents 3GPP TS 24.301 and TS 24.008.

PLMN: Acronym for Public Land Mobile Network, which means the network identification number of the operator. In the UE roaming situation, the PLMN is divided into Home PLMN (HPLMN) and Visited PLMN (VPLMN).

CIoT: Abbreviation for Cellular Internet of Things, means to perform based on IoT communication.

Narrowband-IoT: This means improved RAT (Radio Access Technology) in 3GPP for CIoT. In other words, this means a network operating at a maximum bandwidth of 180 kHz (corresponding to one PRB).

Control plane CIoT EPS optimization: Signaling optimization on a control plane for enabling efficient transmission of user data (IP-based or non-IP based or SMS-based user data).

User plane CIoT EPS optimization: Signaling optimization on a user plane for enabling efficient transmission of user data (IP-based or non-IP based or SMS-based user data).

UE supporting CIoT EPS optimization: UE supporting the control plane CIoT EPS optimization or user plane CIOT EPS optimization and one or more other CIoT EPS optimization.

NB-S1 mode: This means a mode in which the UE operates in the improved radio access technology (RAT) for NB (Narrowband) IoT.

WB-S1 mode: This mode means a mode in which the UE operates in a general RAT mode, not the an improved RAT for the NB IoT.

Hereinafter, the present disclosure will be described with reference to the drawings.

Hereinafter, the present disclosure will be described with reference to the drawings.

Figure 6:
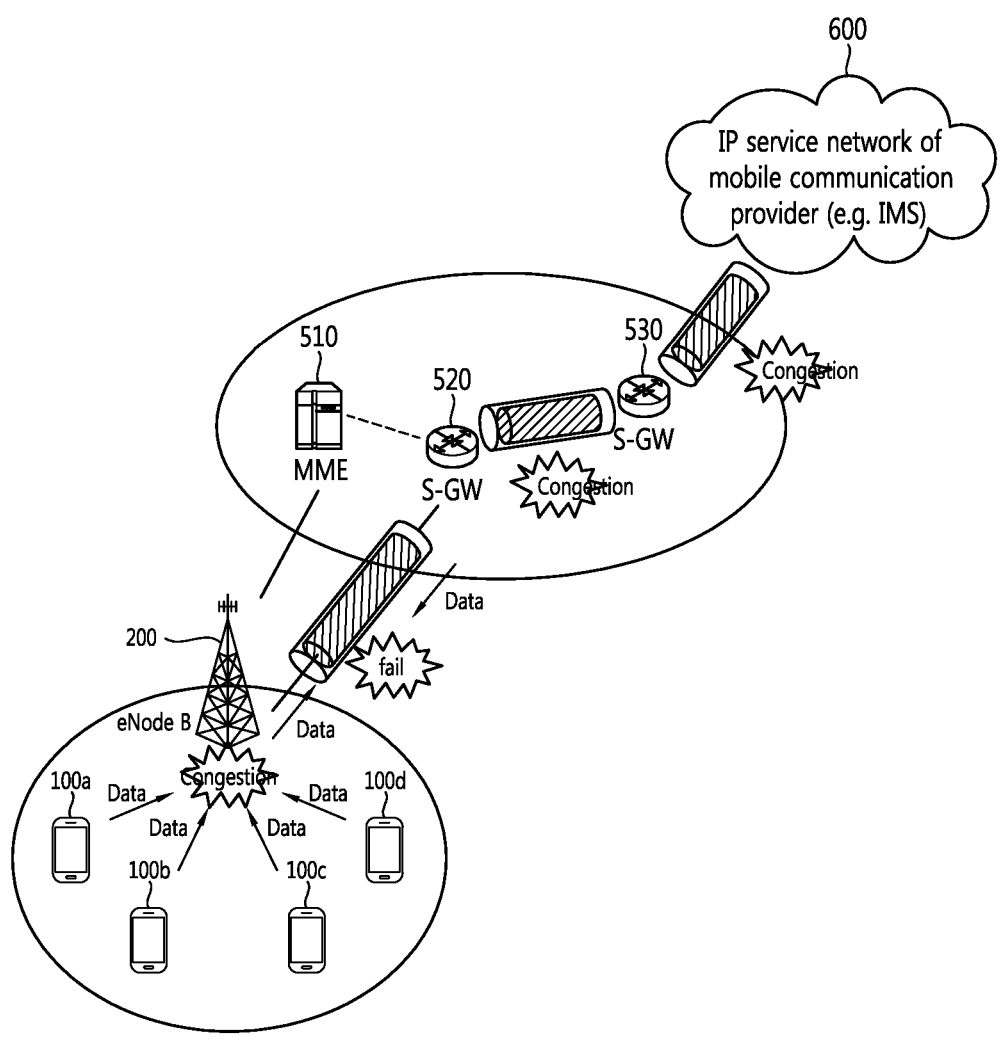
FIG. 6 shows the network overload condition.

FIG. 6 shows the network overload state.

As shown in FIG. 6, the coverage of the eNodeB 200 contains a large number of UEs 100a, 100b, 100c, and 100d, which attempt data transmission/reception. As a result, if traffic in the interface between the eNodeB 200 and the S-GW 520 is overloaded or congested, the downlink data to the UE 100 or the uplink data from the UE 100 fails to be transmitted correctly.

Alternatively, if the interface between the S-GW 520 and the PDN-GW 530 or the interface between the PDN-GW 530 and a IP service network of a mobile communication provider 600 is overloaded or congested, the downlink data to the UEs 100a, 100b, 100c, and 100d or the uplink data from the UEs 100a, 100b, 100c, and 100d fails to be transmitted correctly.

If the interface between the eNodeB 200 and the S-GW 520 has an overload or congestion state, or if the interface between the S-GW 520 and the PDN-GW 530 has an overload or congested state, a node of the core network (e.g., MME) performs congestion control (NAS level congestion control) at the NAS level to avoid or control signaling congestion and APN congestion.

The congestion control at the NAS level includes an APN-based congestion control and a general NAS level mobility management control.

The APN-based congestion control refers to the EMM, GMM and (E) SM signaling congestion control associated with UE and specific APN and includes the APN-based session management congestion control and the APN-based mobility management congestion control.

To the contrary, in the general NAS level mobility management control, a node (MME and SGSN) in the core network rejects the Mobility Management signaling request requested by the UE/MS in a general network congestion or overload situation, thus avoiding the congestion and overload.

In general, when the core network performs the NAS level congestion control, the network carries a back-off timer value in the NAS reject message and transmits the message to the UE in an idle mode or in a connected mode. Thus, the UE does not request the EMM/GMM/(E) SM signal to the network until the back-off timer expires. The NAS rejection message includes one of attach rejection, tracking area updating (TAU) rejection, RAU (routing area updating) rejection, service rejection, extended service rejection, PDN connectivity rejection, bearer resource allocation rejection, bearer resource modification rejection, and deactivate EPS bearer context request rejection.

The back-off timer may be divided into Mobility Management (MM) back-off timers and Session Management (SM) back-off timers.

The MM back-off timer operates independently for each UE while the SM back-off timer operates independently for each APN and for each UE.

Briefly, the MM back-off timer is configured for controlling EMM/GMM signal (e.g., Attach, TAU/RAU request, etc.). The SM back-off timer is configured for controlling (E)SM signal (e.g., PDN connectivity, Bearer Resource Allocation, Bearer Modification, PDP Context Activation, PDP Context Modification request, etc.).

Specifically, when a congestion occurs in the network, the MM back-off timer is used to control the congestion in terms of the mobility management. When the timer is activated, the timer disallows the UE to perform attach, location information update (TAU, RAU), service request procedure. However, in the case of an emergency bearer service or multimedia priority service (MPS), the UE may request the signal even when the timer is operating.

As described above, the UE receives the MM back-off timer value from a core network node (e.g., MME, SGSN, etc.) or a lower layer (Access Stratum). Further, the timer may be randomly configured within a range of 15 to 30 minutes by the UE.

When a congestion occurs in the network, the SM back-off timer is used to control the congestion in terms of the session management. When the timer is running, the timer prevents the UE from configuring or modifying the associated APN-based session. However, in the case of an emergency bearer service or a multimedia priority service (MPS), the UE 100 may request the signal even when the timer is operating.

The UE receives the SM back-off timer value from the core network node (e.g., MME, SGSN, etc.) and the timer value is randomly configured within 72 hours by the UE. Further, the timer value be randomly configured within a range of 15 to 30 minutes by the UE 100.

In another example, when congestion occurs in the eNodeB 200, the eNodeB 200 may also perform congestion control. That is, when the UE requests an RRC connection establishment for the purpose of data transmission on the user plane, and when the eNodeB 200 is in the congestion state, the eNodeB 200 may send the rejection response along with an extended wait timer to the UE 100. In this case, the RRC connection establishment request cannot be re-attempted by the UE until the extended wait timer expires. To the contrary, when the UE makes an RRC connection request to transmit a control plane signal for receiving a circuit switch (CS)-based call, the eNodeB cannot reject the request even when the eNodeB 200 is in the congestion state.

Figure 7:
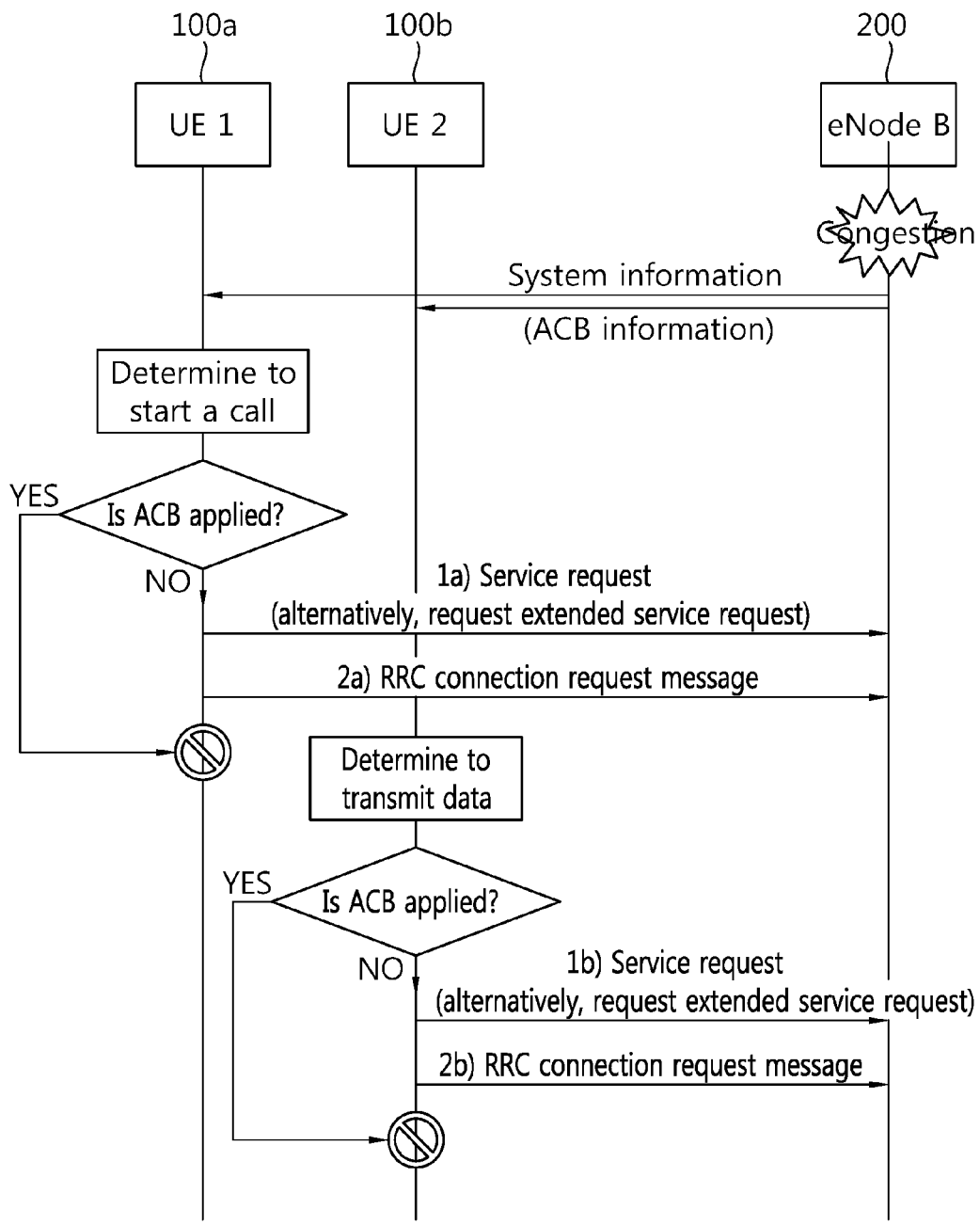
FIG. 7 is an exemplary flow chart illustrating the access blocking operation in the network congestion state.

FIG. 7 shows an example flow diagram of access barring operation in the network congestion state.

As shown in FIG. 7, in the overload or congestion state of the network or eNodeB 200, the eNodeB 200 may broadcast Access Class Barring (ACB)-related information in the system information. The system information may be SIB (System Information Block) type 2.

The SIB (System Information Block) type 2 may include ACB-related information as shown in a following table.

TABLE 2

| Field | Description |
| --- | --- |
| ac-BarringFactor | If the random value generated by the UE is smaller than the value of ac-BarringFactor, the access is allowed. Otherwise, access is prohibited. |
| ac-BarringForCSFB | ACB for circuit switch (CS) fallback. CS fallback is to convert the VoLTE call to the previous 3G call. |
| ac-BarringForEmergency | ACB for emergency service. |
| ac-BarringForMO-Data | ACB for mobile-originating (MO) data. |
| ac-BarringForMO-Signalling | ACB for the mobile-originating control signal. |
| ac-BarringForSpecialAC | ACB for A special access class, that is, 11-15. |
| ac-BarringTime | This indicates the time when access is prohibited. |
| ssac-BarringForMMTEL-Video | Service-specific ACB for mobile-originating of MMTEL video. |
| ssac-BarringForMMTEL-Voice | Service specific ACB for mobile-originating of MMTEL voice. |

In one example, the UE1 100a determines originating of a call by an IMS service, e.g., VoLTE, and generates the service request message. Similarly, UE2 100b determines originating of generic data and generates a service request message.

Then, the UE1 100a generates an RRC connection request message. Similarly, UE2 100b generates an RRC connection request message.

In one example, the UE1 100a performs an access barring check (i.e., ACB application or non-application). Similarly, the UE2 100b performs an access barring check (i.e., ACB application or non-application).

When the ACB is applied, the UE1 100a and the UE2 100b can transmit a service request (or an extended service request) message and an RRC connection request message, respectively. However, when the ACB is applied, the UE1 100a and the UE2 100b cannot transmit the RRC connection request messages.

The access barring check (ABC) is described in detail as follows. The UE is generally randomly assigned at least one of the ten access classes (e.g., AC0, AC1, . . . , AC9). Exceptionally, AC10 is assigned for emergency access. The value of the randomly assigned access class may be stored in each USIM of the UE1 100 and UE2 100b. Then, the UE1 100a and the UE2 100b use a barring factor field included in the received ACB-related information based on the stored access class to check whether the access barring is applied. This access barring check is performed in each AS (Access Stratum) layer of the UE1 100a and the UE2 100b, that is, the RRC layer.

The access barring check is described in more detail below.

When the ac-BarringPerPLMN-List is included in the SIB type 2 received by the UE1 100a and the UE2 100b, and the ac-BarringPerPLMN-List includes an AC-BarringPerPLMN entry matching the plmn-identityIndex corresponding to the PLMN selected by the higher layer, the UE1 100a and the UE2 100b may select the AC-BarringPerPLMN entry matching the PLMN-identityIndex corresponding to the PLMN selected by the higher layer.

Next, when the UE1 100a and the UE2 100b attempt an RRC connection request, the UE1 100a and the UE2 100b may perform an access barring check using T303 as a Tbarring and ac-BarringForMO-Data as a barring parameter.

When the barring is determined, each AS layer (i.e., the RRC layer) of the UE1 100a and UE2 100b informs the higher layer of the failure of the RRC connection establishment.

Then, when the access is barred, each AS layer (i.e., RRC layer) determines whether the T302 timer or the Tbarring timer is running. If it is not running, the AS layer drives the T302 timer or Tbarring timer.

In one example, while the T302 timer or the Tbarring timer is running, the AS layer (ie, the RRC layer) considers that all accesses to the corresponding cell are barred.

As described above, in the network overload and congestion situations, the eNB/RNC provides ACB (Access Class Barring)-related information to the UE. Then, the UE checks the access barring using a barring factor included in the received ACB information based on the access class stored in the USIM. This access barring check eventually prevents the access attempt. That is, if the access to the corresponding cell is barred via the access barring check, the UE does not attempt to access thereto. If the access to the corresponding cell is not barred, the UE attempts to access thereto. This access barring check is performed by the Access Stratum (AS) layer of the UE. In this connection, the access attempt means transmitting an RRC connection request message from the AS layer (i.e., RRC layer) of the UE to the eNB/RNC.

In one example, the access barring check is performed on the general mobile-originating (MO) service of the UE, e.g., call originating, data originating, IMS voice originating, IMS video originating. That is, the ACB applies to accesses by all application programs (except for responses to emergency services or paging).

Figure 8:
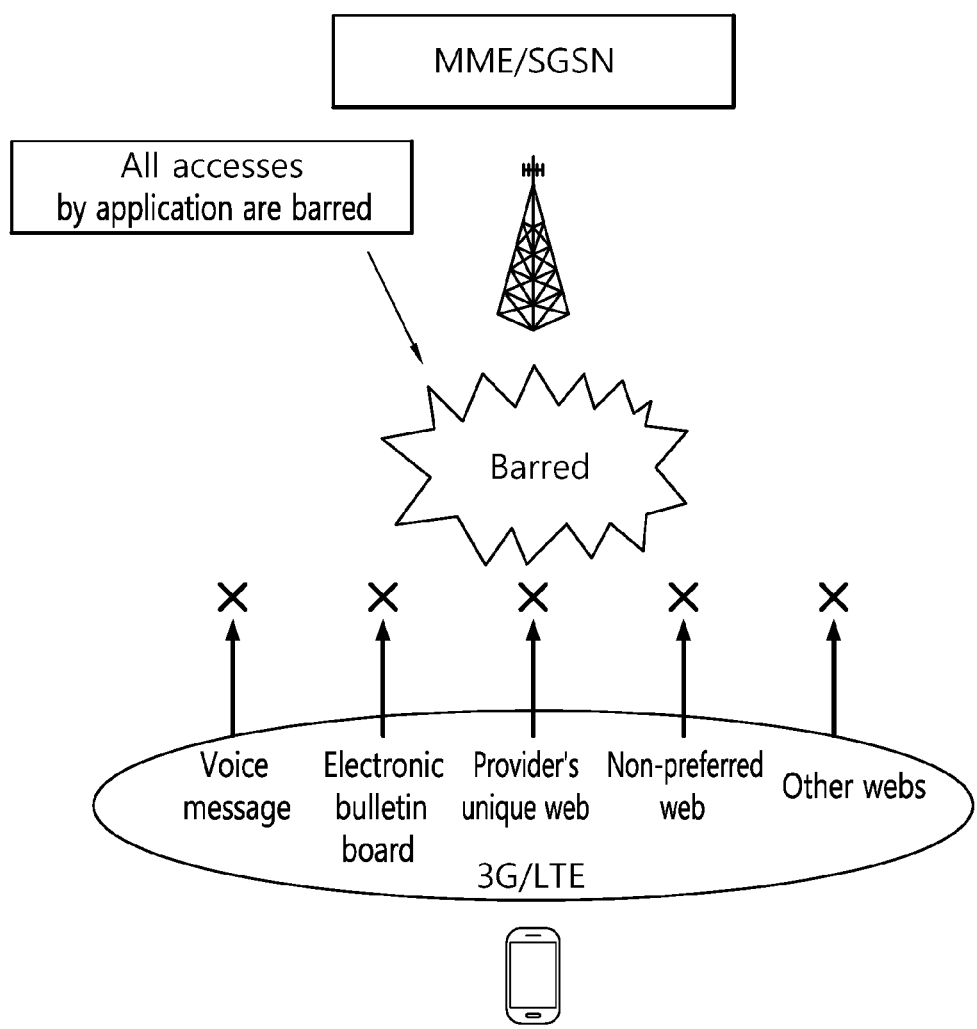
FIG. 8 shows an example where all applications are blocked from access when ACB is applied.

FIG. 8 shows an example in which when ACB is applied, all accesses by all applications are barred.

As may be seen from FIG. 8, once the ACB is determined to be applied, all access by the UE's applications (except for responses to emergency services or paging) are all barred.

In this way, the access by all applications is barred, and thus differentiated service becomes impossible. This eventually wastes network resources and deteriorates user experience.

Therefore, a scheme for differentiating MO (Mobile Originating) services (e.g., call originating or data originating) based on a specific application group/category in the network overload and congestion situations is needed. However, there is absent such a scheme in the prior art.

<Introduction of Application-Specific Congestion Control for Data Communication (ACDC)>

As a scheme for differentiating a general mobile-originating (MO) service, e.g., originating call, originating data, IMS voice originating, IMS video originating, an application-specific congestion control for data communication (ACDC) has been proposed.

Figure 9:
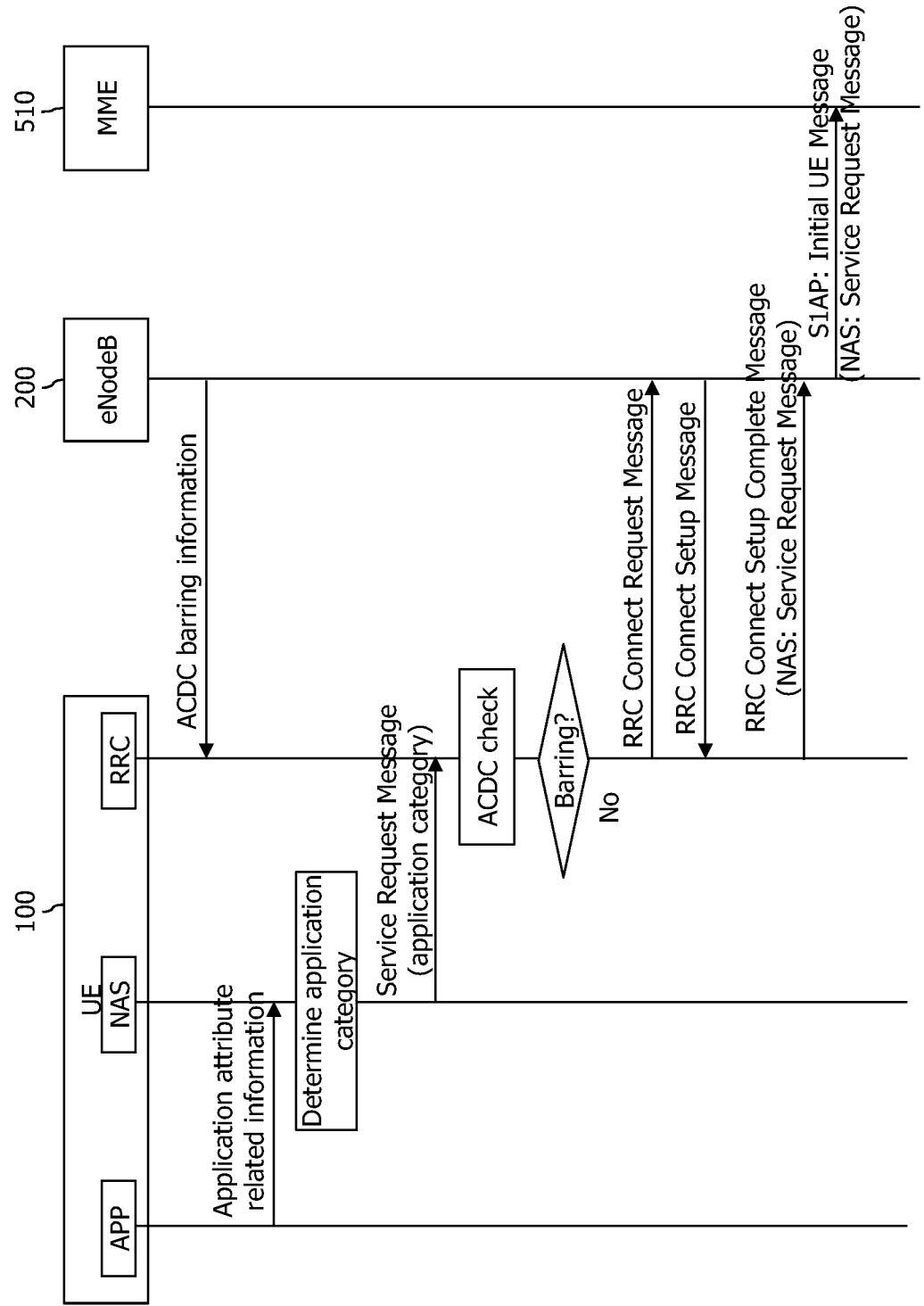
FIG. 9 is a signal flow diagram showing the procedure according to ACDC.

FIG. 9 is a signal flow diagram showing procedure according to ACDC.

Referring to FIG. 9, the ACDC will be described.

First, the network (e.g., base station) may provide ACDC barring information to the UE via the SIB.

In one example, if a specific application is executed in the UE 100 and a data communication service is requested by the specific application, the application layer responsible for the execution of the specific application provides the NAS layer with application attribute-related information.

The NAS layer of the UE 100 then determines the application category for the ACDC based on the application attribute-related information received from the application layer.

Then, when the NAS layer of the UE 100 starts transmission of a service request procedure for service connection (transmission of a service request message or transmission of an extended service request message), the NAS layer delivers information about the application category to the AS layer (i.e., the RRC layer).

Before the AS layer (i.e., the RRC layer) of the UE 100 performs a service request procedure (transmission of a service request message or transmission of an extended service request message) of the NAS layer, the AS layer performs an ACDC barring check based on the category of the application and ACDC barring information received from the network, to determine whether to allow or disallow the service request procedure accordingly.

When, from the ACDC barring check result, the service request procedure is not barred but allowed, the AS layer (i.e., RRC layer) of the UE 100 transmits an RRC connection request message to the eNodeB 200.

As described above, ACDC may differentiate the service requests as required from the application running in the UE and thus allow or disallow the service requests.

<MTC (Machine Type Communication) Communication>

Machine Type Communication (MTC) means communication between a machine and a machine. In this connection, the used device is called the MTC device. The service provided via the MTC device (device) is different from the communication service intervened by the person, and may be applied to various categories of service.

Figure 10:
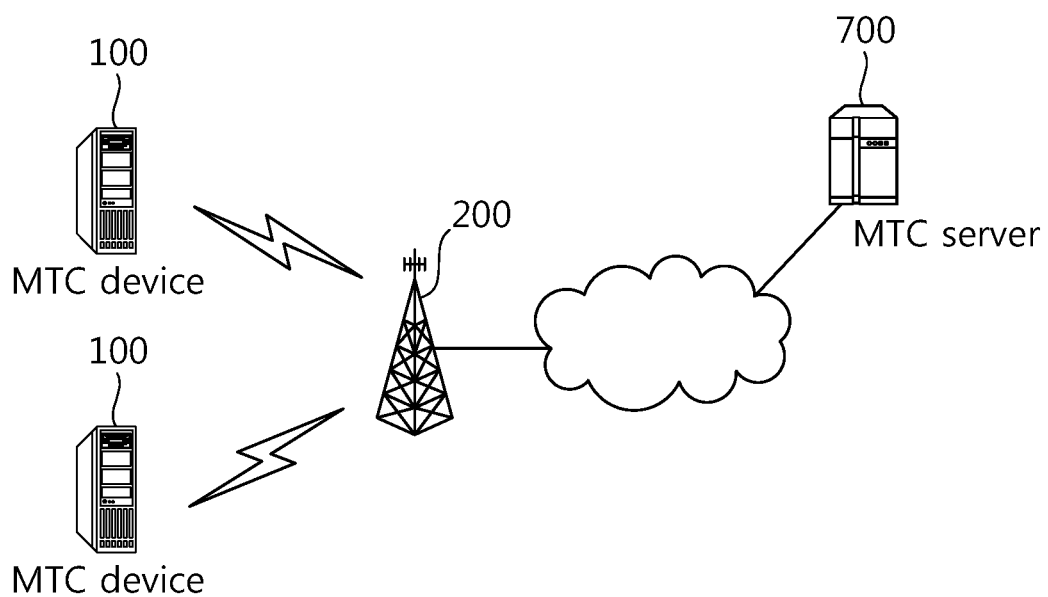
FIG. 10 shows an example of MTC (Machine Type Communication) communication.

FIG. 10 shows an example of MTC (Machine Type Communication) communication.

MTC (Machine Type Communication) refers to exchange of information between base stations 200 between MTC devices 100 that do not involve human interaction or exchange of information between MTC device 100 and MTC server 700 through a base station.

The MTC server 700 is an entity communicating with the MTC device 100. The MTC server 700 runs the MTC application and provides a MTC specific service to the MTC device.

The MTC device 100 is a wireless device that provides MTC communication, and the device 100 may be fixed or mobile.

However, a large number of MTC devices may be deployed within the coverage of the base station. Thus, network congestion may get worse.

Figure 11:
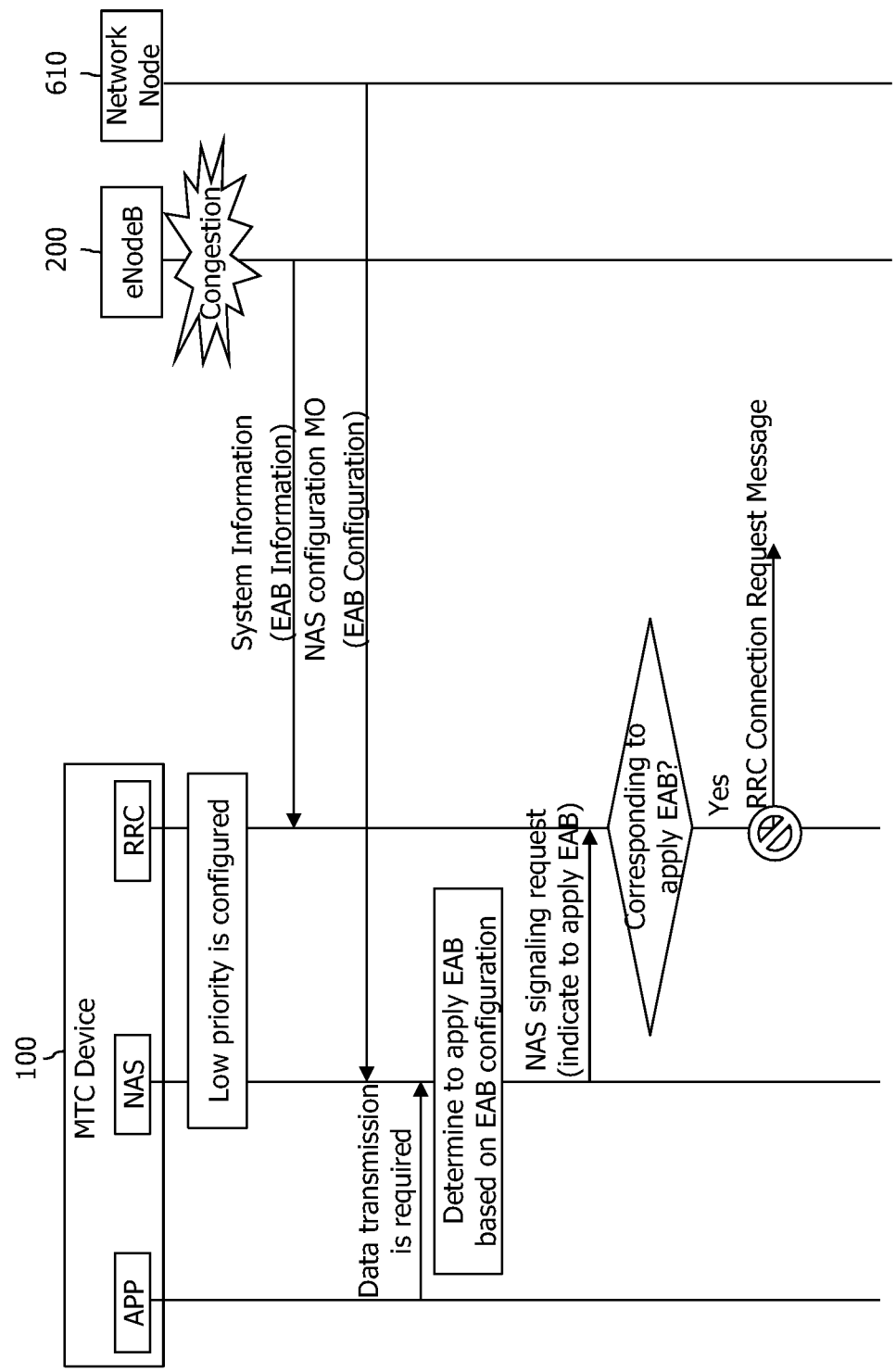
FIG. 11 shows an example of applying Extended Access Barring (EAB) to resolve congestion caused by MTC device.

FIG. 11 shows an example in which Extended Access Barring (EAB) is applied to solve the congestion caused by the MTC device.

As shown in FIG. 11, the MTC device is configured with low priority. In order to solve the congestion caused by the MTC device, the base station broadcasts system information including EAB information. The system information including the EAB information may be SIB (system information block) type 14.

TABLE 3

| SIB Type 14 description |
| --- |
| eab-BarringBitmap: This is a bitmap of the EAB for access class (AC) 0 to 9. The leftmost bit in the bitmap is for AC 0, and the next bit is for AC 1. |
| eab-Category: This indicates the category of the UE to which the EAB is applied. |
| eab-Common: This is an EAB parameter applied to all PLMNs. |
| eab-PerPLMN-List: This is a PLMN-specific EAB parameter and is listed in a PLMN order. |

In addition, the network includes configuration information on whether the specific MTC device should apply the EAB, that is, EAB configuration information, into the NAS configuration management object (MO). The network then forwards the MO to a specific MTC device. Thus, When the low priority and EAB are configured to the MTC device, the NAS layer therein is configured to supply an indication to the RRC layer of whether the EAB is to be applied to the corresponding NAS signaling request procedure (e.g., attach request procedure, TAU/RAU request procedure, service request procedure, extended service request procedure, data service request procedure) except for the emergency call, mobile terminated (MT) access or high priority access class (AC 11 to 15). Then, the RRC layer uses the EAB application or non-application indication to perform the access control by applying or non-applying the EAB to the RRC connection establishment procedure in a response to the corresponding request.

Accordingly, as shown, when the application (APP) layer of the MTC device 100 notifies of the NAS layer that data transmission is necessary, the NAS layer determines whether to apply the EAB based on the EAB configuration. Then, the NAS signaling request is transmitted to the RRC layer. In this connection, an EAB application or non-application indication is sent together with the NAS signaling request.

The RRC layer of the MTC device determines whether the RRC connection establishment request is subjected to the EAB application based on the EAB application or non-application indication. If the EAB is applied, transmission of the RRC connection establishment request message by the RRC layer is barred (or inhibited).

<CIoT (Cellular Internet of Things) Communication>

MTC communication is also called IoT (Internet of Things) communication because there is no human intervention. Performing IoT communication in a cellular manner rather than using a wireless LAN like Wi-Fi is called CIoT. Unlike the wireless LAN, CIoT supports not only IP based communication but also non-IP based communication.

Meanwhile, in order to support CIoT service, 3GPP improved the physical layer, namely RAT (Radio Access Technology). The improved RAT is called NB-IoT (Narrowband-IoT).

The improved RAT for the NB-IoT uses an optimized physical layer (e.g., carrier bandwidth of 180 kHz, subcarrier spacing of 3.75 kHz or 15 kHz) for very low power consumption.

<Optimization for Data Transmission/Reception of CIoT Device>

Since the CIoT device transmits and receives a small amount of data, as described above, the CIoT device may operate in a network operating at an improved RAT for NB-IoT, that is, a bandwidth of up to 180 kHz (corresponding to one PRB).

However, even when the CIoT device transmits/receives a small amount of data, the CIoT device must transmit and receive a lot of signaling with the network in advance. Thus, this cause an inefficiency. This will be described with reference to FIG. 12a.

Figure 12A:
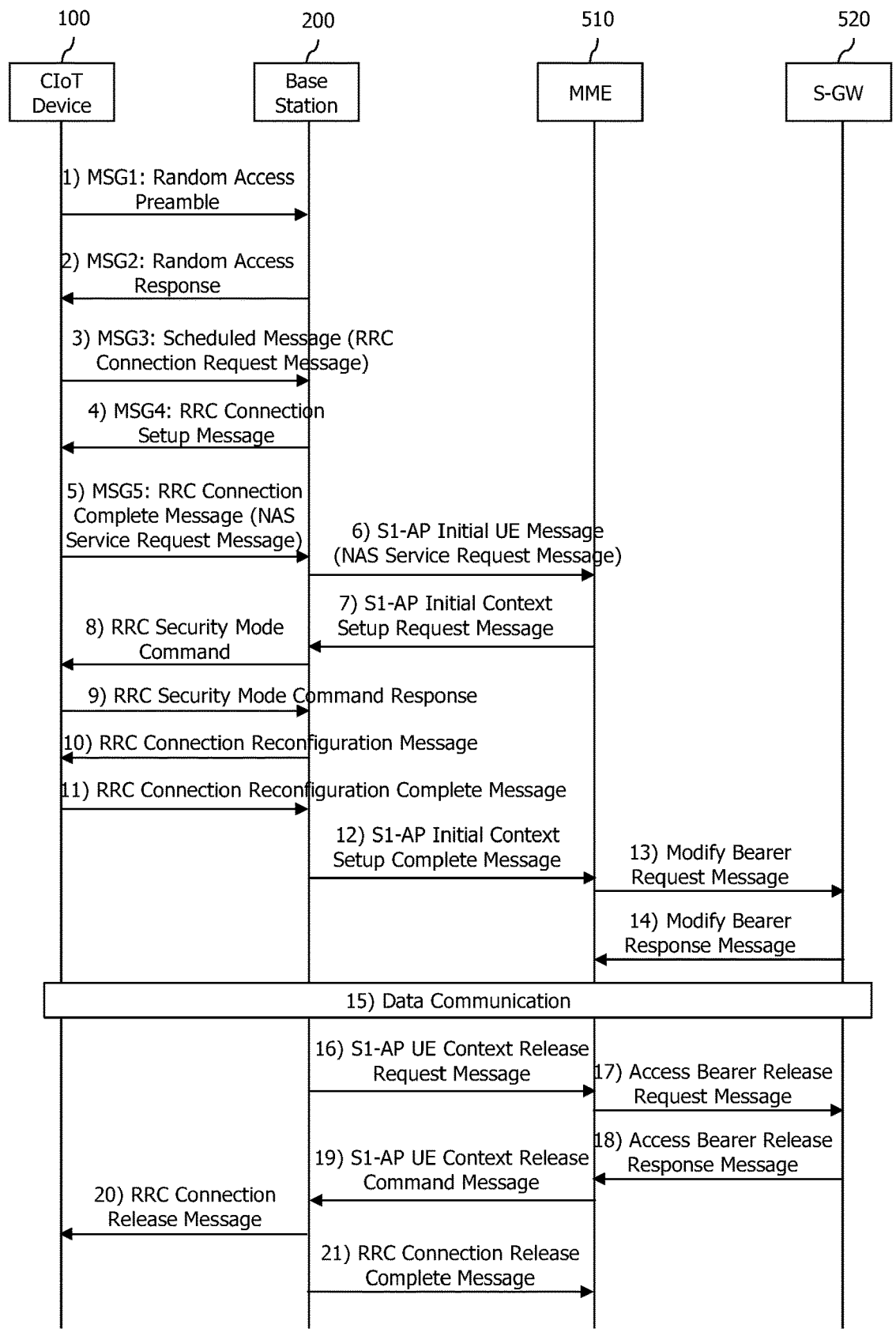
FIG. 12a shows the sequence of procedures that a CIoT device performs for data communication.

FIG. 12a shows the sequence of procedures that the CIoT device performs for data communication.

Hereinafter, referring to FIG. 12a, the description is as follows.

1 to 5) First, the CIoT device 100 performs a random access procedure for data communication. That is, the CIoT device 100 transmits a first message MSG1, e.g., a random access preamble to the base station 200. Then, the CIoT device 100 receives a second message MSG2. e.g., a random access response message from the base station 200. Then, the CIoT device 100 transmits a third message MSG3, e.g., a scheduled message to the base station 200. The scheduled message may include an RRC connection request message. Thereafter, the CIoT device 100 receives a fourth message MSG4, e.g., an RRC connection configuration message from the base station 200. Then, the CIoT device 100 transmits a fifth message MSG5, e.g., RRC Connection Complete message to the base station 200. The RRC connection complete message may include an NAS service request message.

6 to 7) Then, the base station 200 transmits an S1-AP-based initial UE message to the MME 510 through the MME. The initial UE message may include the NAS service request message. The MME 510 transmits an S1-AP-based Initial Context Setup Request message to the base station.

8 to 9) Then, the base station 200 transmits an RRC security mode command (SMC) to the CIoT device and receives an RRC security mode command response.

10 to 11), the base station 200 transmits an RRC connection reconfiguration message to the CIoT device 100. The CIoT device 100 transmits an RRC connection reconfiguration complete message to the base station.

12 to 14) The base station 200 transmits an S1-AP-based initial context setup complete message to the MME 510. Then, the MME 510 transmits a Modify Bearer Request message to the S-GW 520 and receives a modified bearer response message from the S-GW 520.

15) Eventually, the CIoT device 100 may perform data communication.

16 to 19) In one example, when data communication is completed and no RRC connection is needed, the base station 200 transmits an S1-AP-based UE context release request message to the MME 510. Then, the MME 510 transmits an access bearer release request message to the S-GW 520. Then, the S-GW 510 delivers an access bearer release response message to the MME 510. The MME 510 transmits the S1-AP-based UE context release command to the base station.

20) The base station 200 transmits an RRC Connection Release message to the UE, and transmits an RRC Connection Release Complete message to the MME 510.

As described above, even when the CIoT device 100 transmits/receives a small amount of data, the CIoT device 100 has to send and receive a considerable number of signals to and from the base station 200, which is inefficient.

In particular, the CIoT devices are expected to be located at a fairly high density within the coverage of the base station. In this situation, the fairly large number of signals may overload the network.

Therefore, there is an attempt to solve such a problem by using attempts to optimize an evolved packet service (EPS) for CIoT using a control plane (CP) and a user plane (User Plane). The attempts to optimize an evolved packet service (EPS) for CIoT using a control plane (CP) and a user plane (User Plane) will be respectively described as follows:

1. Control Plane (CP) CIoT EPS Optimization

This is a scheme for transmitting data by including data in the PDU (Packet Data Unit) of the NAS layer. Without using the existing user plane setup (DRB+S1-U path) required for data transmission, data is transmitted using a control plane (SRB+S1-AP) for transmitting NAS messages such as attach and TAU (Tracking Area Update) of NAS layer. To this end, the S11-U path is newly defined between the MME and the S-GW. Data may be transmitted through the newly defined S11-U path. In this connection, for the security of the data, the security of the NAS layer may be employed instead of the security of the AS layer. Since the security of the AS layer is unnecessary, the SMC (Security mode command procedure, etc.) may be omitted. Further, the RRC signaling required when switching the RRC connection mode is reduced.

This is described with reference to FIG. 12b.

Figure 12B:
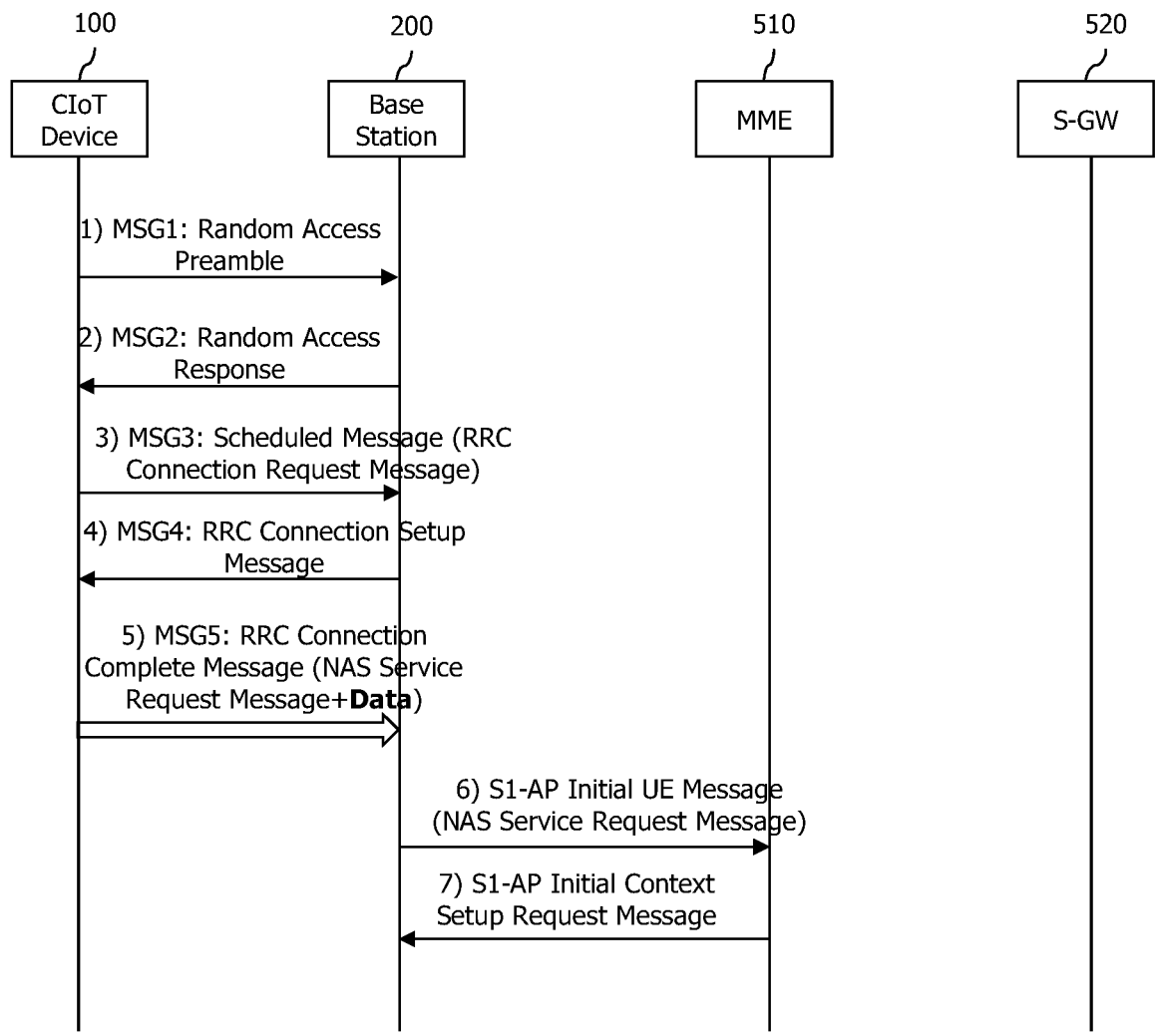
FIG. 12b shows the procedure by which the CIoT device transmits data according to the control plane (CP) CIoT EPS optimization.

FIG. 12b shows the procedure in which the CIoT device transmits data according to the control plane (CP) CIoT EPS optimization.

As can be seen from FIG. 12b, the CIoT device 100 can transmit data by including the data in the NAS service request message included in the fifth message MSG5, e.g., the RRC connection complete message.

That is, when comparing FIG. 12a and FIG. 12b, in FIG. 12a, the CIoT device 100 transmits data in the 15th process. This is inefficient. In FIG. 12b, the CIoT device 100 is able to transmit data in the fifth process, which is effectively improved.

2. User Plane (UP) CIoT EPS Optimization

If there is no data transmission/reception, instead of removing (deleting) the UE context (i.e., UE id, AS security information, etc.) stored in the CIoT device and the base station, the corresponding context is maintained. Further, when there is no data transmission/reception, the CIoT device performs the RRC connection suspend procedure instead of performing the S1 release procedure. Therefore, when the CIoT device requests the RRC connection again, the device may transition rapidly the RRC idle mode to RRC connected mode. That is, the RRC connection resume procedure is performed instead of the service request procedure for user plane setup. Therefore, the number of RRC signals that the CIoT device should send/receive to switch from the RRC idle mode (EMM-IDLE) to the RRC connected mode (EMM-CONNECTED) is significantly reduced.

Figure 12C:
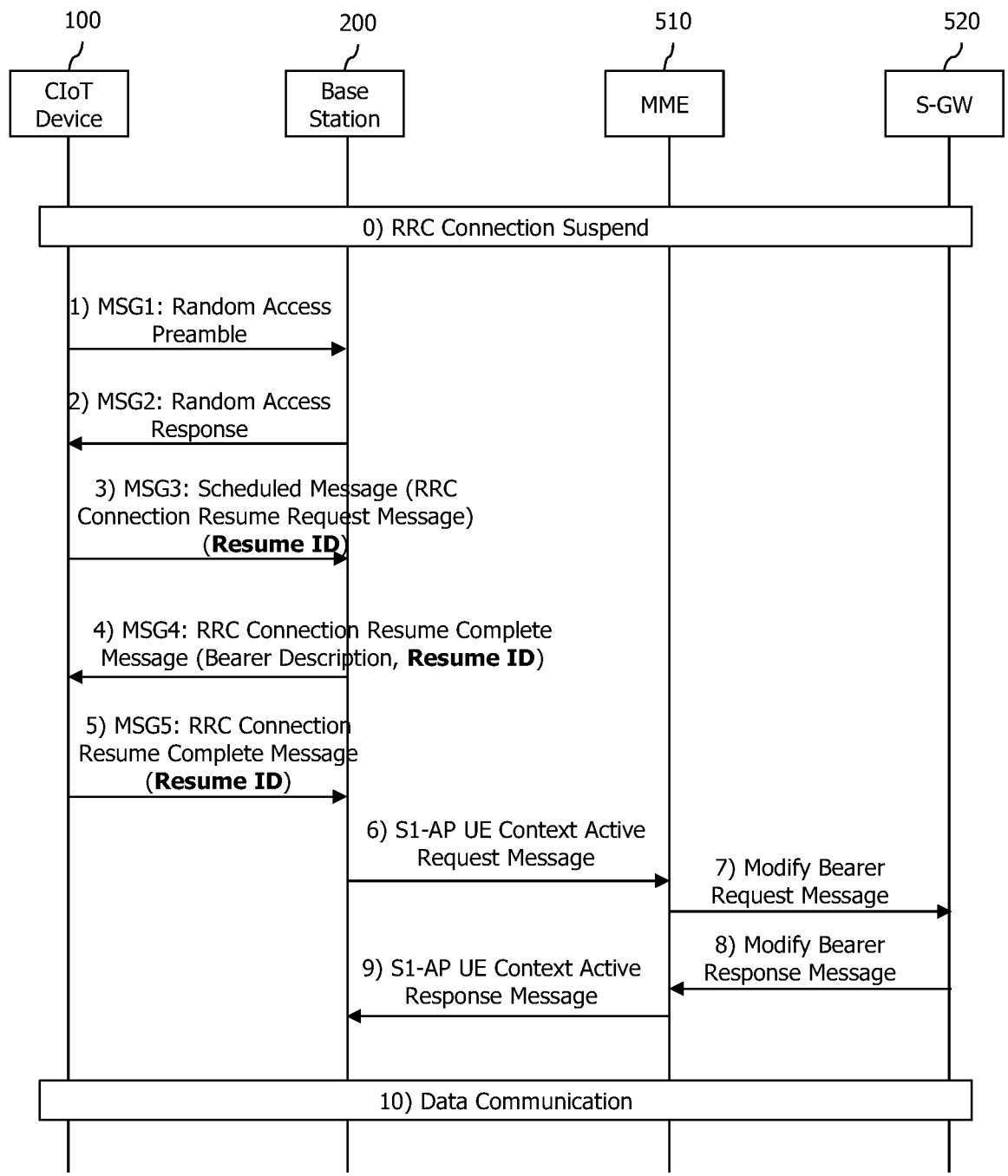
FIG. 12c shows the procedure by which the CIoT device transmits data according to the user plane (UP) CIoT EPS optimization.

FIG. 12c shows a procedure in which the CIoT device transmits data according to the user plane (UP) CIoT EPS optimization.

0) First, if there is no data transmission/reception, the UE context stored in the CIoT device 100 and the base station 200 is not removed or deleted but is maintained. Instead of performing the S1 release procedure, the RRC connection suspend procedure is performed.

1 to 2) Then, when data communications is again required, the CIoT device 100 transmits a first message, e.g., a random access preamble, to the base station 200. The CIoT device 100 receives a second message, e.g., a random access response from the base station 200.

3) Then, the CIoT device 100 transmits an RRC connection resume request message in a third message, e.g., a scheduled message. In this connection, the resume ID is included in the RRC connection resume request message.

4 to 5) The base station 200 transmits a fourth message, e.g., an RRC connection resume complete message to the CIoT device 100. In this connection, the RRC connection resume complete message includes a resume ID and a bearer descriptor. Then, the CIoT device 100 transmits a fifth message, e.g., an RRC connection resume complete message to the base station 200. The RRC connection resume complete message also includes the resume ID.

6) The base station 200 transmits S1-AP-based UE context activation request message to the MME 510.

7 to 9) Then, the MME 510 transmits modify bearer request message to the S-GW 520 and receives a modified bearer response message from the S-GW 520. The MME 510 then transmits a UE context activation response message to the base station 200.

10) Thus, the CIoT device 100 may perform data communication.

When comparing FIG. 12a and FIG. 12c, in FIG. 12a, the CIoT device 100 transmits data in the 15th process. This is inefficient. In FIG. 12c, the CIoT device 100 is able to transmit data in the 10th process, which is effectively improved.

<The Disclosure of the Present Specification>

NB-IoT RAT may not provide various services developed for the legacy RAT. Specifically, ACB (access class barring), EAB, ACDC, and SSAC may not be provided in the NB-IOT RAT.

However, in CIoT service environment, many CIoT devices perform data transmission. In this case, network overload and congestion situation can occur. However, if the NB-IoT as an improved RAT for CIoT, does not provide access control such as ACB, it is unclear how to deal with the overload and congestion situation of the network.

Furthermore, if the CIoT device only supports the control plane (CP) CIoT EPS optimization, the CIoT device includes user data in the NAS signaling request message (e.g., service request message) of the control plane (CP). In this connection, there is no scheme to perform access control by distinguishing NAS signaling request message including the user data from the general NAS signaling request message free of the user data. Due to this fact, according to the control plane (CP) CIoT EPS optimization, the NAS signaling request message of the control plane (CP) including a small amount of data may also fail to be transmitted in a congestion situation. Thus, the user experience may be degraded and network resources may be wasted.

Therefore, the present disclosure presents Proposals for solving the above problems.

I. Proposal 1 of the Present Disclosure

When a CIoT device using the NB-IoT RAT supports only the control plane (CP) CIoT EPS optimization or both the control plane (CP) CIoT EPS optimization and the user plane (UP) CIoT EPS optimization, in order for the device to transmit a NAS signaling request message including user data to a network node (e.g., MME/SGSN), according to Proposal 1 of the present disclosure, the NAS layer of the device may transmit the call type field and the RRC establishment cause field to the AS layer (eg, RRC layer) as shown below.

For attach request, TAU/RAU request, service request, extended service request, service request message of the control plane (CP) including user data, the call type field may be set to either a mobile originating (MO) CP signaling or a mobile-originating (MO) CP call or to a value indicating a new call type for the control plane (CP) CIoT EPS optimization. In addition, the RRC establishment cause field may be set to either the MO CP data or the MO CP signaling, or to a value indicating a new cause for the control plane (CP) CIoT EPS optimization.

Alternatively, instead of setting the call type field to mobile-originating (MO) signaling or mobile-originating (MO) call, the RRC establishment cause field may be set to either MO CP data or MO CP signaling, or may be set to a value indicating a new cause for the control plane (CP) CIoT EPS optimization.

In one example, the base station may provide information for access barring for the general NAS signaling request, and information for access barring for the NAS signaling request including user data.

The AS layer (e.g., RRC layer) of the device may perform an access barring check on the NAS signaling request including (unlike the general NAS signaling request) the user data or skip the access barring check based on the call type field and/or the RRC establishment cause field received from the NAS layer, and information for the access barring received from the base station.

In one example, the NAS layer of the device may transmit, to the AS layer, the RRC establishment cause field and the call type (call type) field for the service request message of the control plane (CP) as shown in the table below.

TABLE 4

| NAS procedure | RRC establishment cause | Call type |
|---|---|---|
| Service request procedure | When the service request message of the control plane CP is a response to paging and the service type is a mobile terminating MT call, the RRC establishment cause is set to "MT access" | Terminating call |
| | When the service request message of the control plane (CP) is for transmitting user data through the control plane, and the service type is a mobile-originating (MO) call, the RRC establishment cause | Originating Call or a new call type Call type is set to "mobile-originating |

TABLE 4-continued

| NAS procedure | RRC establishment cause | Call type |
|---|---|---|
| | is set to "MO CP data" or "MO CP signaling" or to a new establishment cause. | (MO) CP signaling" or "mobile-originating (MO) CP call" or to a new call type. |

In one example, according to the present disclosure, a new access barring (Access Barring: AB) mechanism is proposed. The new access barring (AB) mechanism is applied to the RRC connection request of the wireless device using the NB-IoT RAT. Alternatively, the mechanism is applied to a RRC connection request of a wireless device using a control plane (CP) CIoT EPS optimization scheme or a user plane (UP) CIoT EPS optimization scheme.

To this end, the base station may broadcast information about the new access barring (AB) mechanism. In this connection, the broadcasting may be performed via SIB type 2 or SIB type 14.

When the SIB type 2 is employed, the SIB type 2 shown in Table 2 above may include fields as shown in a following table.

TABLE 5

| field | SIB type 2 |
|---|---|
| ab-BarringMO-CPData | This indicates whether the RRC connection request with the RRC establishment cause field set to MO CP data should be subjected to AB (access barring) check. |
| ac-BarringSkipForMO-CPData | This indicates whether the access barring check of the RRC connection request with the RRC establishment cause field set to MO CP data should be skipped. |
| ac-BarringSkipForMO-CPSignalling | This indicates whether the access barring check of an RRC connection request with an RRC establishment cause field set to MO CP signaling should be skipped. |
| cp-CIoT-EPS-Optimisation | This indicates whether the wireless device is allowed to establish a connection for control plane (CP) CIoT EPS optimization. |
| cp-CIoT-EPS-Optimisation | This indicates whether the wireless device is allowed to establish a connection for user plane (UP) CIoT EPS optimization. |

In one example, when using the SIB type 14, additional fields may be added as shown in the table below.

TABLE 6

| SIB type 14 | |
|---|---|
| Field | Description |
| ab-BarringBitmap | This represents access class-specific barring for each of access classes 0 to 9. The leftmost bit is for access class 0. |
| Ab-BarringCPDataBitmap | This represents an access class-specific barring for each of access classes 0 to 9 for transmitting data through the control plane. The leftmost bit is for access class 0. |
| ab-BarringMO-CPData | This indicates whether the RRC connection request with the RRC establishment cause field set to MO CP data is subjected to AB (access barring) check. |
| ac-BarringSkipForMO-CPData | This indicates whether the access barring check should be skipped for the RRC connection request with the RRC establishment cause field set to MO CP data. |
| ac-BarringSkipForMO-CPSignalling | This indicates whether the access barring check should be skipped for the RRC connection |

TABLE 6-continued

| SIB type 14 | |
|---|---|
| Field | Description |
| | request with the RRC establishment cause field set to MO CP signaling. |
| ab-Category | This indicates the category of the device to which the AB applies. |

The description will be described in more detail with reference to the drawings as follows.

Figure 13A:
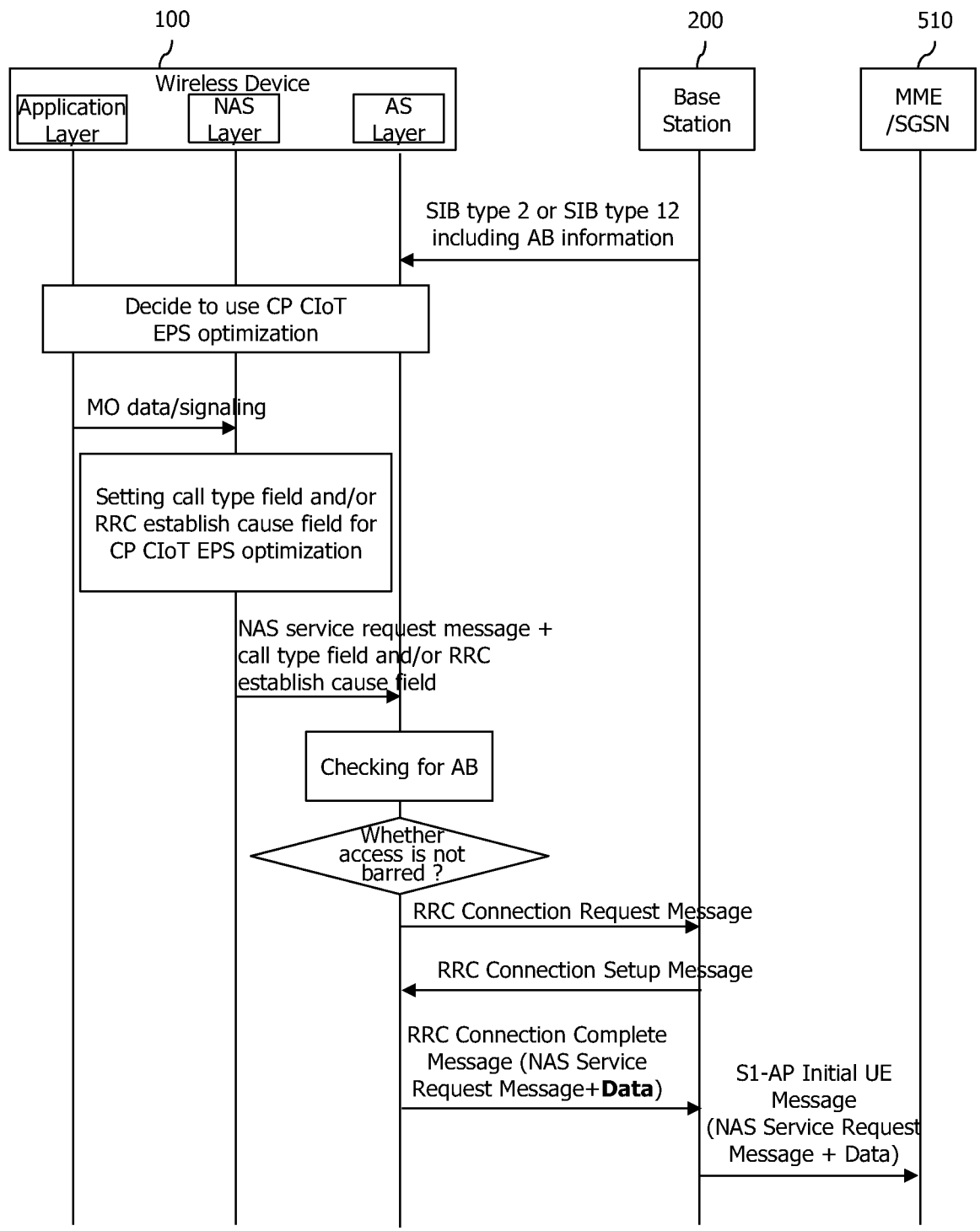
FIG. 13a and FIG. 13b are signal flow diagrams showing the procedure according to Proposal 1 of the present disclosure.
Figure 13B:
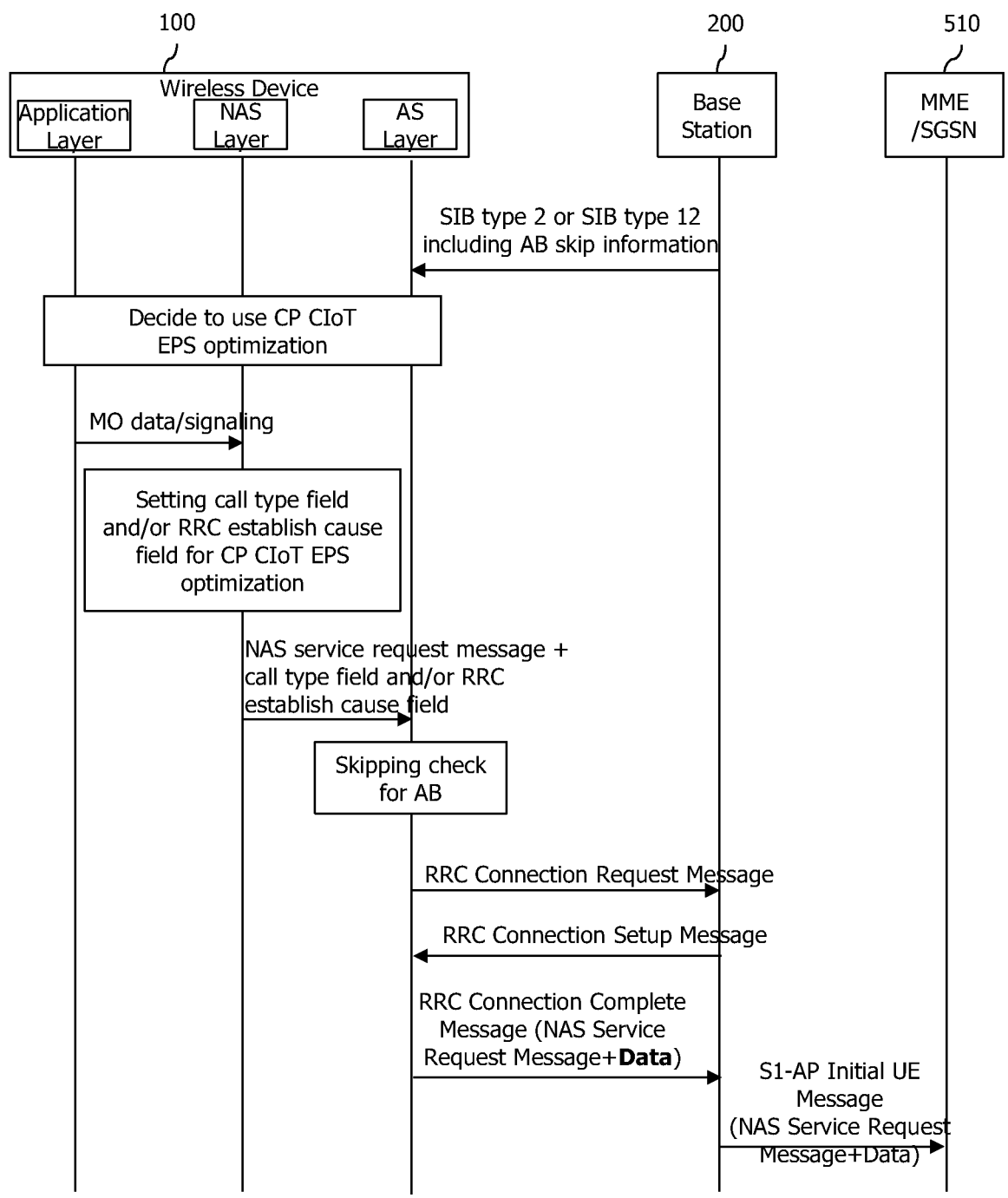

FIGS. 13a and 13b are Signal Flow Diagrams Showing Procedures According to Proposal 1 of the Present Disclosure.

As may be seen from FIGS. 13a and 13b, the base station 200 may broadcast access barring (AB) mechanism-related information. The access barring (AB) mechanism-related information may be included in SIB type 14 as shown in Table 6 and may be broadcasted. Alternatively, the access barring (AB) mechanism-related information may be included in SIB type 2 as shown in Table 5 and broadcast.

In one example, a wireless device (e.g., CIoT device) 100 decides to transmit user data in the control plane (CP) NAS signaling request using the control plane (CP) CIoT EPS optimization.

Accordingly, the application layer of the wireless device (e.g., CIoT device) 100 delivers mobile-originating (MO) data/signaling to the NAS layer.

Then, the NAS layer configures the RRC establishment cause field as either MO CP data or MO CP signaling as shown in Table 4. Alternatively, the NAS layer configures the RRC establishment cause field to a value indicating a new establishment cause for control plane (CP) CIoT EPS optimization. Further, the NAS layer may configure the call type field as one of a mobile-originating (MO) CP signaling and a mobile-originating (MO) CP call or to a value indicating a new call type for control plane (CP) CIoT EPS optimization. Alternatively, the NAS layer does not configure the call type field as mobile-originating (MO) signaling or mobile-originating (MO) call. Instead, the NAS layer configures the RRC establishment cause field to either a MO CP data or an MO CP signaling, or to a value indicating a new cause for the control plane (CP) CIoT EPS optimization.

Then, the NAS layer transmits the NAS service request message including the user data, the RRC establishment cause field, and the call type field to the AS layer.

In this connection, as shown in FIG. 13b, when the call type field received from the NAS layer is set to a mobile-originating (MO) CP signaling, a mobile-originating (MO) CP call or to a new call type for the use of the CP CIoT EPS optimization, and when ac-BarringSkipForMO-CPData or ac-BarringSkipForMO-CPSignalling in Table 5 or Table 6 received from the base station indicates that the check for access barring (AB) should be skipped, the AS layer may skip the access barring (AB) check.

However, when the skipping of the check for the access barring (AB) is not indicated by ac-BarringSkipForMO-CPData or ac-BarringSkipForMO-CPSignalling in Table 5 or Table 6, As shown in FIG. 13a, the AS layer performs the access barring (AB) check. Specifically, when the call type field received from the NAS layer is set to the mobile-originating (MO) CP signaling, mobile-originating (MO) CP call or to the new call type for the use of the CP CIoT EPS optimization, the AS layer uses a timer (e.g., T3xy) as the Tbarring timer. The AS layer performs a check for the access barring (AB) using the ab-BarringMO-CPData in Table 5 or Table 6 received from the base station as a barring parameter. Alternatively, when the establishment cause field received from the NAS layer is set to the mobile-originating (MO) CP data, mobile-originating (MO) CP signaling, or to a new cause for using the CP CIoT EPS optimization, the AS layer performs an access barring (AB) check using a timer (e.g., T3xy) as the timer Tbarring and using ab-BarringMO-CPData in Table 5 or Table 6 received from the base station as a barring parameter.

When intending to perform a check for the access barring (AB), the access to the cell is already barred by the ACB.

A more detailed description of the check for the access barring (AB) will be made below.

The access class of the device is a value between 0 and 9, and the corresponding bit in the ab-BarringCPDataBitmap is set to 0.

In this case, when the AS layer transmits an RRC connection establishment request message including a call type field set to a mobile-originating (MO) CP signaling or a mobile-originating (MO) CP call or when the AS layer transmits an RRC connection establishment request message including a new call type for CP CIoT EPS optimization, and when ab-BarringForMO-CPData is set to false, a following is considered as follows:

The AS layer considers the access to the cell as not barred.

To the contrary, when the device has one or more access classes from access classes 11 through 15, when the corresponding bit in ab-BarringForSpecialAC is set to 0, The AS layer considers the access to the cell as not barred.

That is, when the NAS layer was informed from the AS layer that the transmission of the RRC connection request with the RRC establishment cause field previously set to the general mobile-originating (MO) call was barred, but the transmission of a new service request message is initiated to transmit the user data through the control plane, the NAS layer may initiate a procedure for transmission of the service request message.

In one example, if from the result of the check for the access barring (AB), the access is determined to be barred, the AS layer sends an indication to the NAS layer indicating that RRC connection establishment or RRC connection resumption has failed and suspends the related operation. Then, the AS layer may drive the timer T3xy.

Specifically, when, from the result of the check for the access barring (AB) is determined to be barred, and when the timer T3xy and timer Tbarring are not running, the AS layer generates a randomly distributed random value rand to satisfy the range 0≤rand<1.

Then, the timer Mbarring set to the timer value calculated using the ac-BarringTime in the access barring parameter as follows is driven.

"$T$barring"$=(0.7+0.6*\text{rand})*ac\text{-BarringTime};$

When the NAS layer receives an indication that the access failed due to the barring, the NAS layer aborts the procedure for transmission of the NAS signaling request including user data. Then, the NAS layer does not perform the procedure to transmit the NAS signaling request again until the NAS layer receives an indication from the AS layer that the barring is mitigated.

In one example, when the timer T3xy expires or is stopped, and if the timer T302 is not running, the AS layer of the device may inform the NAS layer that the access barring for the RRC connection establishment request or RRC connection resume including a call type field set to a mobile-originating (MO) CP signaling or a mobile-originating (MO) CP call, or a call type field set to a value indicating a new cause for CP CIoT EPS optimization has been alleviated.

Further, when the timer T302 expires or is stopped, and if the timer T3xy is not running, the AS layer of the device may inform the NAS layer that the access barring for the RRC connection establishment request or RRC connection resume including a call type field set to a mobile-originating (MO) CP signaling or a mobile-originating (MO) CP call, or a call type field set to a value indicating a new cause for CP CIoT EPS optimization has been alleviated.

In another example, in the congestion situation of the network, when the RRC establishment cause field in the RRC connection request message received by the base station is set to mobile-originating (MO) CP data or mobile-originating (MO) CP signaling, or when the RRC establishment cause field is set to a new cause for CP CIoT EPS optimization, the base station may differentiate between the RRC connection request messages. That is, the base station may process the RRC connection request message with a high priority or a low priority. In this connection, processing the message with the higher priority may mean less barring by lowering the barring rate. To the contrary, processing the message with the lower priority may mean more barring by increasing the barring rate.

The base station may transmit an RRC connection establishment acceptance message or an RRC connection establishment rejection message as a response to reception of the RRC connection request message. The RRC connection establishment rejection message may include a wait timer value or an extended wait timer value or a new wait timer value. The new wait timer value is to differentiate between uses of the CP CIoT EPS optimization. If the wait timer value is set to, for example, a maximum of 16 seconds and the extended wait timer value is set to a maximum of 1800 seconds, the value of the new wait timer may be set to a maximum of 8 seconds for the high priority processing or a maximum of 3600 seconds for low priority processing.

In one example, when a low priority is allocated to the NAS signaling, the NAS layer of the device may transmit the RRC establishment cause field set to delay tolerant together with the NAS signaling request (e.g., attach request, TAU request, service request, etc.) to the AS layer. When a device configured to have the low priority uses the CP CIoT EPS optimization, according to an exemplary embodiment, the NAS layer of the device may set the RRC establishment cause field to the MO layer or the MO CP signaling without setting the cause field to the delay tolerant and then transmits the cause field to the AS layer. Alternatively, the NAS layer of the device may set the RRC establishment cause field to a new cause for CP CIoT EPS optimization and then forward the field to the AS layer.

When, in this way, the device supports CP CIoT EPS optimization, the access barring check may be performed while distinguishing transmission of NAS signaling request including user data from transmission of request of NAS signaling not including user data.

II. Proposal 2 of the Present Disclosure

Hereinafter, in describing the Proposal 2 of the present disclosure, only content differentiating from the content of the Proposal 1 of the present disclosure will be described. and the same content therebetween may recite the content of the Proposal 1 described above.

According to Proposal 2 of the present disclosure, in order that the NAS layer of the wireless device (e.g., CIoT device) transmits a NAS signaling request message including user data, instead of setting the existing call type and RRC establishment cause field, the NAS layer delivers an indication to the AS layer that the NAS signaling request message includes user data according to CP CIoT EPS optimization.

More specifically, for a service request message of a control plane (CP) including NAS signaling request, e.g. attach request, TAU/RAU request, service request, extended service request, The NAS layer of the device sets the call type to the mobile-originating (MO) signaling or mobile-originating (MO) call corresponding to the existing call type and transfers the call type to the AS layer.

The NAS layer of the device sets the RRC establishment cause field image to the MO data or MO signaling in the previous manner.

However, the NAS layer of the device passes an indication to the AS layer that the NAS signaling request message includes the user data according to the CP CIoT EPS optimization.

Further, the description will be described in more detail with reference to the drawings as follows.

Figure 14A:
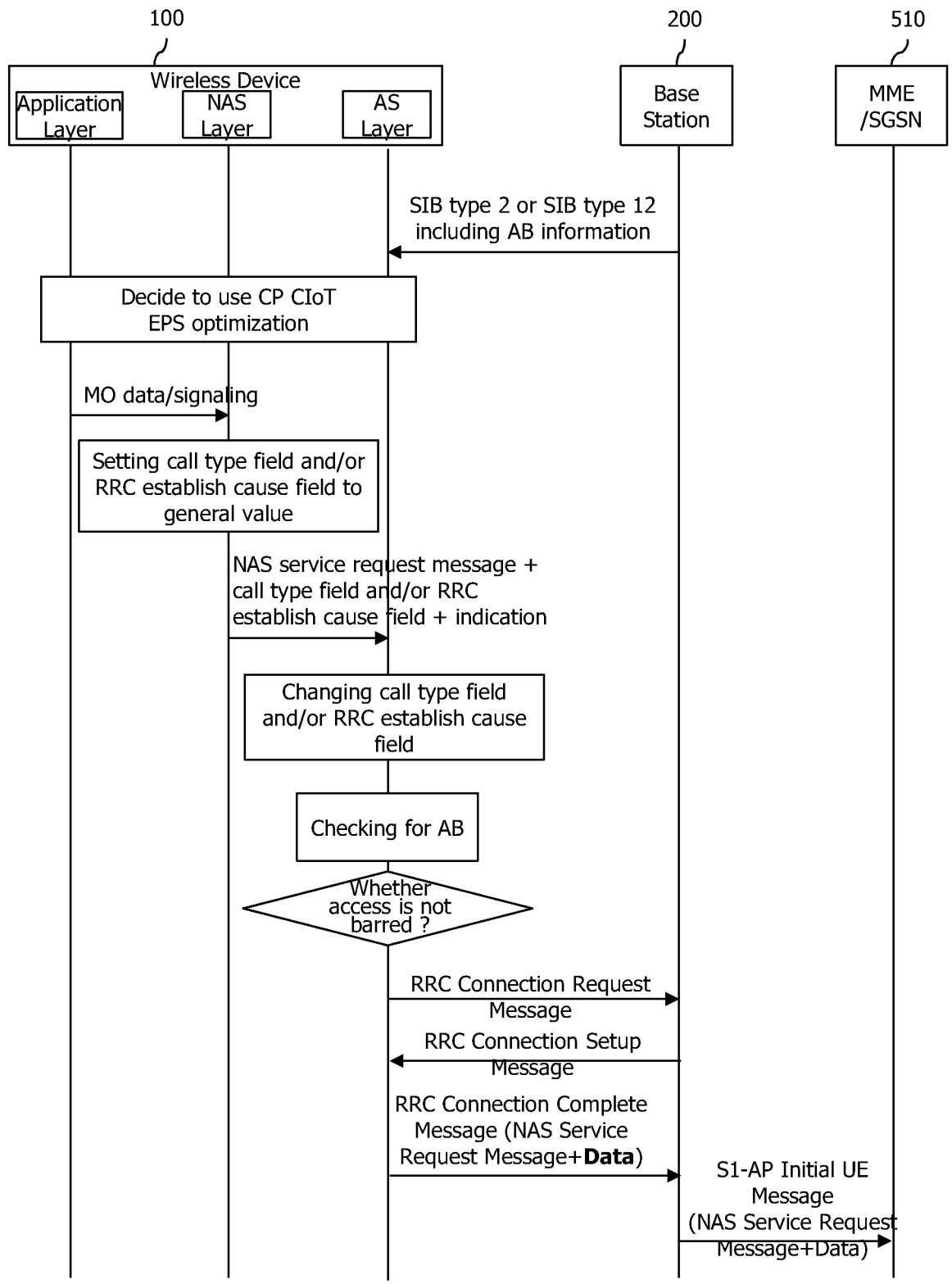
FIG. 14a and FIG. 14b are signal flow diagrams showing the procedure according to Proposal 2 of the present disclosure.
Figure 14B:
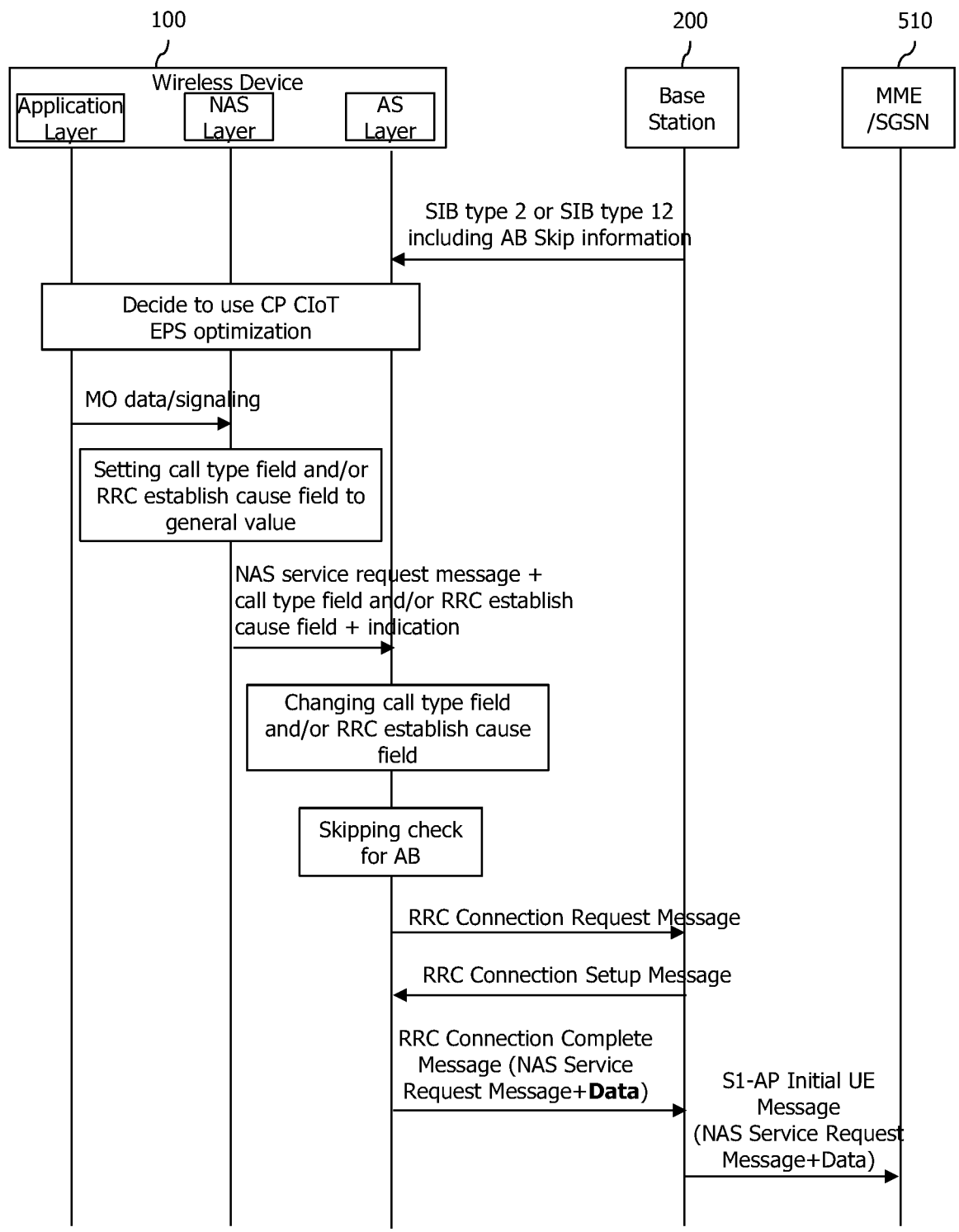

FIG. 14a and FIG. 14b are signal flow diagrams showing procedures according to Proposal 2 of the present disclosure.

The description with reference to FIG. 14a and FIG. 14b will be described below with reference to content different from the content of FIG. 13a and FIG. 13b. The same content therebetween will be described as above.

In order that the NAS layer of the wireless device (e.g., CIoT device) 100 transmits a NAS signaling request message including user data, instead of setting the existing call type and RRC establishment cause field, the NAS layer delivers an indication to the AS layer that the NAS signaling request message contains the user data according to CP CIoT EPS optimization.

The AS layer (e.g., the RRC layer) may change the RRC establishment cause field to the MO CP data or MO CP signaling based on the indication provided by the NAS layer and the information about the access barring received from the base station. Alternatively, the AS layer may change the RRC establishment cause field to a new cause for the CP CIoT EPS optimization.

Then, based on the indication provided from the NAS layer, the AS layer performs a check for access barring (AB) for the NAS signaling request including the user data as shown in FIG. 14a or alternatively, may skip the check for access barring (AB) as shown in FIG. 14b. Details of this are shown in FIG. 13a and FIG. 13b.

In one example, the NAS layer was informed previously from the AS layer that the transmission of an RRC connection request with an RRC establishment cause field set to the general mobile-originating (MO) call was barred. However, when the transmission of a new service request message is initiated to transmit the user data through the control plane, the NAS layer may initiate a procedure for transmission of the service request message.

In one example, when the low priority is allocated to the NAS signaling, the NAS layer of the device may forward, to the AS layer, the RRC establishment cause field set to delay tolerant together with the NAS signaling request (e.g., attach request, TAU request, service request, etc.). When the device set to the low priority uses the CP CIoT EPS optimization, according to one embodiment, the NAS layer of the device does not set the RRC establishment cause field to the delay tolerant, but sets the RRC establishment cause field to the MO data or MO signaling or passes an indication to the AS layer that the NAS signaling request message includes the user data according to CP CIoT EPS optimization. The AS layer may then change the RRC establishment cause field to a mobile originating (MO) CP signaling or a mobile-originating (MO) CP call based on the establishment cause field set to the MO data or MO signaling or change the field to a new cause for CP CIoT EPS optimization based on the indication.

When, in this way, the device supports CP CIoT EPS optimization, the access barring check may be performed while distinguishing transmission of NAS signaling request including user data from transmission of request of NAS signaling not including user data.

The above-described proposals may be used in combination with each other.

The above descriptions may be implemented in hardware. This will be described with reference to the drawings.

Figure 15:
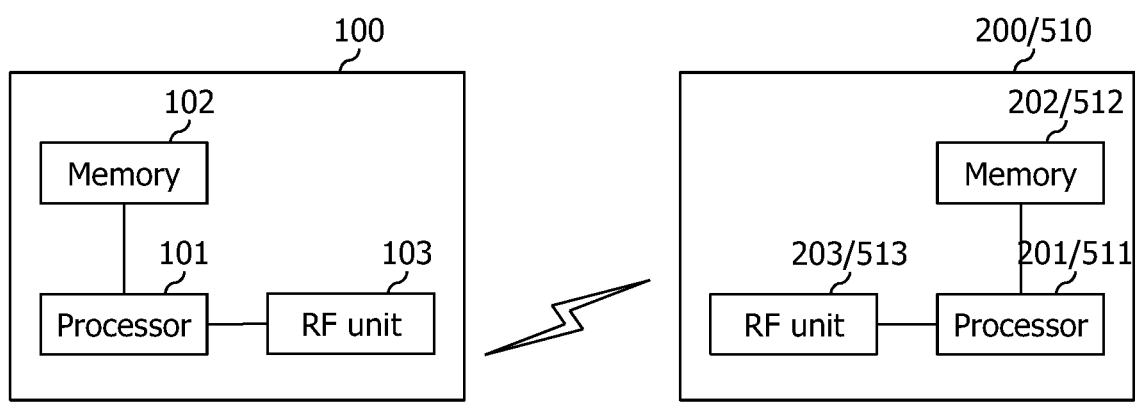
FIG. 15 is a block diagram of a CIoT device 100 and a network device according to an embodiment of the present invention.

FIG. 15 is a block diagram of a CIoT device 100 and a network device according to an embodiment of the present invention.

As shown in FIG. 15, the CIoT device 100 includes a processor 101, a memory 102, and a transmitting/receiving unit 103. The network device may be a base station 200 or an MME/SGSN 510. The network device 200 or 510 includes a processor 201 or 511, a memory 202 or 512, and a transmitting/receiving unit 203 or 513.

The memories 102, 202 or 512 store the method described above.

The processors 101, 201 or 511 control the memories 102, 202 or 512 and the transmitting/receiving units 103, 203 or 513, respectively. Specifically, the processors 101, 201, or 511 execute the methods stored in the memories 102, 202 or 512 respectively. The processors 101, 201, or 511 transmit the above-described signals via the transmitting/receiving units 103 or 203, 513 respectively.

Although the preferred embodiments of the present invention have been described above, the scope of the present invention is not limited to the specific embodiments. Therefore, the present invention may be modified, changed, or improved in various forms within the spirit of the present invention and the scope of the claims.

What is claimed is:

1. A method for transmitting a radio resource control (RRC) message by a wireless device, the method comprising:

acquiring, by an access stratum (AS) layer of the wireless device, a non-access stratum (NAS) signaling request message, an RRC establishment cause field and a call type field from an NAS layer;

checking, by the AS layer, the acquired RRC establishment cause field and call type field;

based on the NAS signaling request message including user data based on an optimization scheme through a control plane (CP), determining, by the AS layer, whether to perform or skip a check for access barring (AB) based on at least one of the RRC establishment cause field or the call type field; and based on a determination that the check is skipped or a determination from a result of performing the check that an access is not barred, transmitting, by the AS layer, a RRC connection request message to a base station to transmit the NAS signaling request message including the user data.

2. The method of claim 1, wherein at least one of the acquired RRC establishment cause field or call type field is set to a value representing the optimization scheme through the CP.

3. The method of claim 1, wherein the acquiring includes further acquiring an information from the NAS layer representing that the NAS signaling request message includes the user data based on the optimization scheme through the CP.

4. The method of claim 3, wherein based on the checking of the acquired RRC establishment cause field and call type field determining that at least one of the acquired RRC establishment cause field or call type field is set to a general value, the method further comprises changing at least one of the RRC establishment cause field or the call type field to the value representing the optimization scheme through the CP based on the information.

5. The method of claim 1, wherein the method further comprises receiving information related to the access barring (AB) from the base station.

6. The method of claim 5, wherein the information related to the AB includes information representing whether an access barring check is executed or skipped for an RRC connection request message including the call type field or the RRC establishment cause field set to a value representing the optimization scheme through the CP.

7. A wireless device for transmitting a radio resource control (RRC) message, the device comprising:
   a transceiver; and
   a processor configured for controlling the transceiver, wherein the processor includes an access stratum (AS) layer and an non-access stratum (NAS) layer,
   wherein the access stratum (AS) layer of the processor is configured for:
   acquiring a non-access stratum (NAS) signaling request message, an RRC establishment cause field and a call type field from an NAS layer;
   checking the acquired RRC establishment cause field and call type field;
   based on the NAS signaling request message including user data based on an optimization scheme through a control plane (CP), determining whether to perform or skip a check for access barring (AB) based on at least one of the RRC establishment cause field or the call type field; and
   based on a determination that the check is skipped or a determination from a result of performing the check that an access is not barred, transmitting, by the AS layer, a RRC connection request message to a base station to transmit the NAS signaling request message including the user data.

8. The device of claim 7, wherein at least one of the acquired RRC establishment cause field or call type field is set to a value representing the optimization scheme through the CP.

9. The device of claim 7, wherein the AS layer is further configured for further acquiring an information from the NAS layer representing that the NAS signaling request message includes the user data based on the optimization scheme through the CP.

10. The device of claim 9, wherein based on the AS layer determining that at least one of the acquired RRC establishment cause field or call type field is set to a general value, the AS layer is further configured for changing at least one of the RRC establishment cause field or the call type field to the value representing the optimization scheme through the CP based on the information.

11. The device of claim 7, wherein the AS layer is further configured for receiving information related to the access barring (AB) from the base station.

12. The device of claim 11, wherein the information related to the AB includes information representing whether an access barring check is executed or skipped for an RRC connection request message including the call type field or the RRC establishment cause field set to a value representing the optimization scheme through the CP.

* * * * *